United States Patent [19]
Yang

[11] Patent Number: 5,872,776
[45] Date of Patent: Feb. 16, 1999

[54] SIGNAL DETECTION AND INTERFERENCE CANCELLATION BASED ON SIMPLIFIED MATRIX INVERSION FOR CDMA APPLICATIONS

[76] Inventor: Lin-Lang Yang, 9979 Riverhead Dr., San Diego, Calif. 92129

[21] Appl. No.: 754,425

[22] Filed: Nov. 22, 1996

Related U.S. Application Data

[60] Provisional application No. 60/007,469, Nov. 22, 1995 and provisional application No. 60/007,475, Nov. 22, 1995.

[51] Int. Cl.$^6$ .............................. H04B 1/69; H04J 13/00
[52] U.S. Cl. ........................ 370/342; 370/441; 375/349; 455/65
[58] Field of Search ................................... 370/335, 342, 370/441, 479; 375/206–210, 346, 348, 349, 316; 455/501, 63, 65, 67.3

[56] References Cited

U.S. PATENT DOCUMENTS

| | | | |
|---|---|---|---|
| 5,579,304 | 11/1996 | Sugimoto et al. | 370/342 |
| 5,644,592 | 7/1997 | Divsalar et al. | 370/206 |
| 5,717,717 | 2/1998 | Yang et al. | 370/342 |
| 5,719,852 | 2/1998 | Schilling et al. | 370/342 |

OTHER PUBLICATIONS

Aazhang, B., "An Analysis of Nonlinear Direct–Sequence Correlators", IEEE Transactions on Communications, vol. 37, No. 7, pp. 723–731, Jul. 1989.

Aazhang, G., "Neural Networks for Multiuser Detection in Code–Division Multiple–Acess Communications", IEEE Transactions on Communications, vol. 40, No. 7, pp. 1212–1222, Jul. 1992.

Verdu, S., "Minimum Probability of Error for Asynchronous Gaussian Multiple–Acess Channels", IEEE Transactions on Information Theory, vol. IT–32, No. 1, Jan. 1986.

Lupas,. Ruxandra, "Near–Far Resistance of Multiuser Detectors in Asynchronous Channels", IEEE Transactions on Communications, vol. 38, No. 4, pp. 496–507, Jul. 1990.

Xie, Z., Rushforth, C, "Multiuser Signal Detection Using Sequential Decoding", IEEE Transactions on Communications, vol. 38, No. 5, pp. 578–583, May, 1990.

Varanasi, M.K., Multistage Detection in Asynchronous Code–Division Multiple–Access Communications, IEEE Transactions on Communications, vol. 38, No. 4, pp. 509–519, Apr. 1990.

Primary Examiner—Chi H. Pham
Assistant Examiner—Ricky Q. Ngo
Attorney, Agent, or Firm—Fish & Richardson P.C.

[57] ABSTRACT

A multiuser detector for a CDMA system for real-time processing. Interference information of cross correlation from the signals of different users is processed to enhance the signal-to-noise ratio by suppressing the interference noise in a multiple-stage processing. A sampling processor is implemented to obtain at least two sets of data for each user with different integration times. The operation of the detector is dynamically adjusted to the operating condition of the CDMA system in a near real-time manner.

11 Claims, 20 Drawing Sheets

DB (Decision Block)

SIGNAL DETECTION AND INTERFERENCE CANCELLATION BASED ON SIMPLIFIED MATRIX INVERSION FOR CDMA APPLICATIONS

This application claims the benefit of the U.S. Provisional Application No. 60/007,469, titled "Multiuser Detector for Multiple Access Communication System", filed on Nov. 22, 1995, and 60/007,475, filed Nov. 22, 1995, the disclosures of which are incorporated by reference.

FIELD OF THE INVENTION

The present invention relates to multiple access communication systems, and more specifically, to a detection system for code division multiple access systems.

BACKGROUND AND SUMMARY OF THE INVENTION

Code Division Multiple Access (CDMA) has emerged as a key technology for communication services. CDMA intentionally uses a transmission bandwidth that is usually several orders of magnitude larger than the minimum required signal or information bandwidth, e.g., the bandwidth implied by the basic message symbol rate in a communication system. The power of each user's signal is spread over a wide bandwidth. This results in low power spectral density and thereby the interference to another narrow band signal occupying the same frequency range is reduced. It also makes the presence of the signal less detectable to an invader.

A digital signal from each user in a CDMA system is modulated with a pseudo-noise (PN) binary sequence that is unique to that particular user. This modulation causes the spreading over the wide bandwidth. Each PN sequence appears random to a naive observer but can be reproduced in a deterministic manner by an intended receiver. Any two PN sequences are made substantially orthogonal to each other but some degree of cross correlation still exists. The mutual interference in the same frequency range of multiple users is greatly reduced in a CDMA system. This orthogonality allows multiple access within the same frequency spectrum and makes CDMA systems less vulnerable to intentional or unintentional interference. However, the cross correlation becomes limiting the system capacity as the number of users increases.

Detection of a CDMA system usually involves cross correlation with a locally-generated version of the PN sequence. A desired user signal is generally detected by cross correlating with the exact same PN sequence that is uniquely assigned to that particular user by the system. Signals from other users contribute a small amount of wideband noise due to non-zero cross correlation value produced by the cross correlation operation.

The ratio of the transmission bandwidth over the information bandwidth indicates the degree of the spectrum spreading of a CDMA system. This ratio is often referred as the processing gain. Many beneficial properties of CDMA relate to the processing gain.

FIG. 1 shows a simplified CDMA system 100. User message symbols (e.g., encoded data bits) are modulated with a carrier frequency and spreaded by PN sequence waveforms prior to transmission. A receiver system 130 process the received signals by filtering and correlation operation to recover the embedded user message symbols. A CDMA detector 137 is an essential part of the receiver 130.

CDMA systems have many unique properties. For example, multiple access communication by a large number of users in a common frequency range in the same and neighboring geographical areas are possible. This has particular significance in satellite and cellular communication systems. The number of users simultaneously supported by the system is usually proportional to the processing gain of the CDMA system. The resistance to interference increases with the processing gain. In addition, position location and velocity estimation can be measured with high accuracy in a CDMA system.

The application of CDMA in communication has been demonstrated in a number of systems in use including the IS-95 based CDMA cellular system disclosed in "On the Capacity of A Cellular CDMA System", by Gilhousen et al., IEEE Trans. Veh. Technol., Vol. VT–40(2), pp303–312, May, 1991, a PCS system based on IS-95, and the Globalstar LEO satellite system. The high capacity, high resolution time-of-arrival for positioning measurement, low probability of interception, and independent interference rejection makes CDMA communication systems one of the most promising candidates for multiuser communications.

The multiuser detection system is an important aspect of the CDMA technology. A portion of a simplified CDMA detection system is indicated by the signal mixers 133 and 135 and the detector 137 in FIG. 1. The CDMA detection system plays a substantially role in terms of the system capacity, processing speed, interference resistance, and noise reduction.

One significant limitation of the prior-art multiuser detectors in CDMA systems involves the cross-correlation information among users in signal detection. Many prior-art systems essentially neglect the cross correlation. This increases the symbol error rate performance and consequently reduces the capacity of the system. Specifically, the cross correlation noise is not separated from the autocorrelated signal in many prior-art detectors.

Another limitation of the prior-art systems is the slow processing speed inherent in the detectors. This is partially due to the complexity of the prior-art decoder processing techniques. For example, Verdú first disclosed the idea of the optimal multiuser detector in "Minimum Probability of Error for Asynchronous Gaussian Multiple Access Channels", IEEE Trans. Inform. Theory, Vol. IT-32(1), pp.85–96, 1986. An ensemble of K received asynchronous signals as convolutional codes was used in the proposed system, where K is the number of users in the system. The well-known Viterbi algorithm was used to decode these signals. Lupas and Verdú proved that Verdú's multiuser detector has a low bit error rate and is near-far resistant in "Near-Far Resistance of Multiuser Detectors in Asynchronous Channels", IEEE Trans. Comm, Vol.38(4), 1990. However, Verdú's scheme exhibited two major problems. First, the complexity of the system grows exponentially with the number of transmitted signals K. Even for a moderate value of K, Verdú's system is already hard to implement. Secondly, the whole period of the PN sequence is assumed to be modulated by only one symbol to reduce the computation, which makes the trellis become time invariant.

Several suboptimal multiuser detectors have been introduced after Verdú's detector, aiming at reducing the complexity of Verdú's system. For example, Xie et al. described a detector using sequential decoding in "Multiuser Signal Detection Using Sequential Decoding", IEEE Trans. Commm. Vol.38(5), pp.578–583, 1990. This system has a complexity proportional to K. Lupus and Verdú also disclosed a linear de-correlating detector with complexity proportional to K. However, both of the above systems make the same assumption as in Verdú's system, i.e., the whole period of the PN sequence is modulated by a single symbol.

In view of the above limitations, a new type of multiuser detector with high capacity and fast processing speed is needed to improve the existing CDMA systems. In particular, separation of the cross correlation noise from the signal and reduction of the processing complexity are desirable.

The present invention describes a multiuser detector with a dynamical system control at a high processing speed. Specifically, a double-sampling front-end processor is implemented in the preferred embodiment in accordance with the present invention. The detector further includes a dynamic control module for generating a system control δ-parameter based on the characteristics of the received signals (i.e., the number of users and the processing gain) a correlation processor for processing cross correlation information of the received signals, a plurality of approximation processors for recursively suppressing the cross correlation noise below a predetermined noise tolerance level based on the δ-parameter, and a decision processor for estimating the received symbols. The approximation processors form a plurality of substantially identical processing layers connected to each other in series. The correlation processor feeds information on both auto correlation and cross correlation of the input signals of multiple users to the first approximation processor in the series. In a preferred operation, received signals are processed layer by layer until the cross correlation noise is reduced below the predetermined level.

One aspect of the present invention is the linear dependence of the processing complexity with the number of the simultaneous users present in the system. This feature in combination with other unique properties of the preferred embodiment allows greater system capacity at faster processing speed in comparison with the prior-art systems.

Another aspect is the use of cross correlation information to substantially cancel the interference contributed by the cross correlation signals. This feature presents significant advantage over the prior-art system wherein the cross correlation signals is either neglected or is canceled by using repeated spreading or despreading of the signals. This use of cross correlation information increases the system capacity and reduces hardware complexity.

Still another aspect is the dynamically adjusted system control for a high-speed convergence in the multi-layer processing. The detector of the preferred embodiment controls the decorrelation processing in each processing layers by feeding the layer with a dynamic control parameter δ. An optimized δ-parameter is preferably adjusted and determined individually by the characteristics of a received signal such as the number of the simultaneous users, K, the processing gain, the PN sequence, and the user delay. Generation of the δ-parameter is a simple digital operation at a high speed in the present invention.

Other aspects of the present invention include additional system enhancement by optimally combining the two output signals from the double-sampling front-end processor, digital generation of the PN sequence, and a mechanism for handling decorrelation process at very small user delay times relative to the signal symbol duration.

The details of the preferred embodiment of the present invention are set forth in the accompanying drawings and the description below. Once the details of the invention are known, numerous additional innovations and changes will become obvious to one skilled in the art.

DETAILED DESCRIPTION OF THE INVENTION

The preferred embodiment and examples shown throughout this description should be considered as exemplars, rather than as limitations on the present invention. In particular, the mathematical formulas, equations and some assumptions contained herein are intended to illuminate the processes involved and functions of various system components or are used for clarity of discussion and should not be construed as limitations on the scope and contents of the invention.

Many features of the present invention are described in "Digital Algorithms for Multiuser Detector, Decision-Directed Phase Tracking Loop, and A/D & D/A Converter", a dissertation by Lin-Lang Yang, University of Southern California, December, 1995, the entirety of Chapter 1 and corresponding appendices of which are incorporated herewith by reference.

System Design of Multiuser Detector

Figure 1:
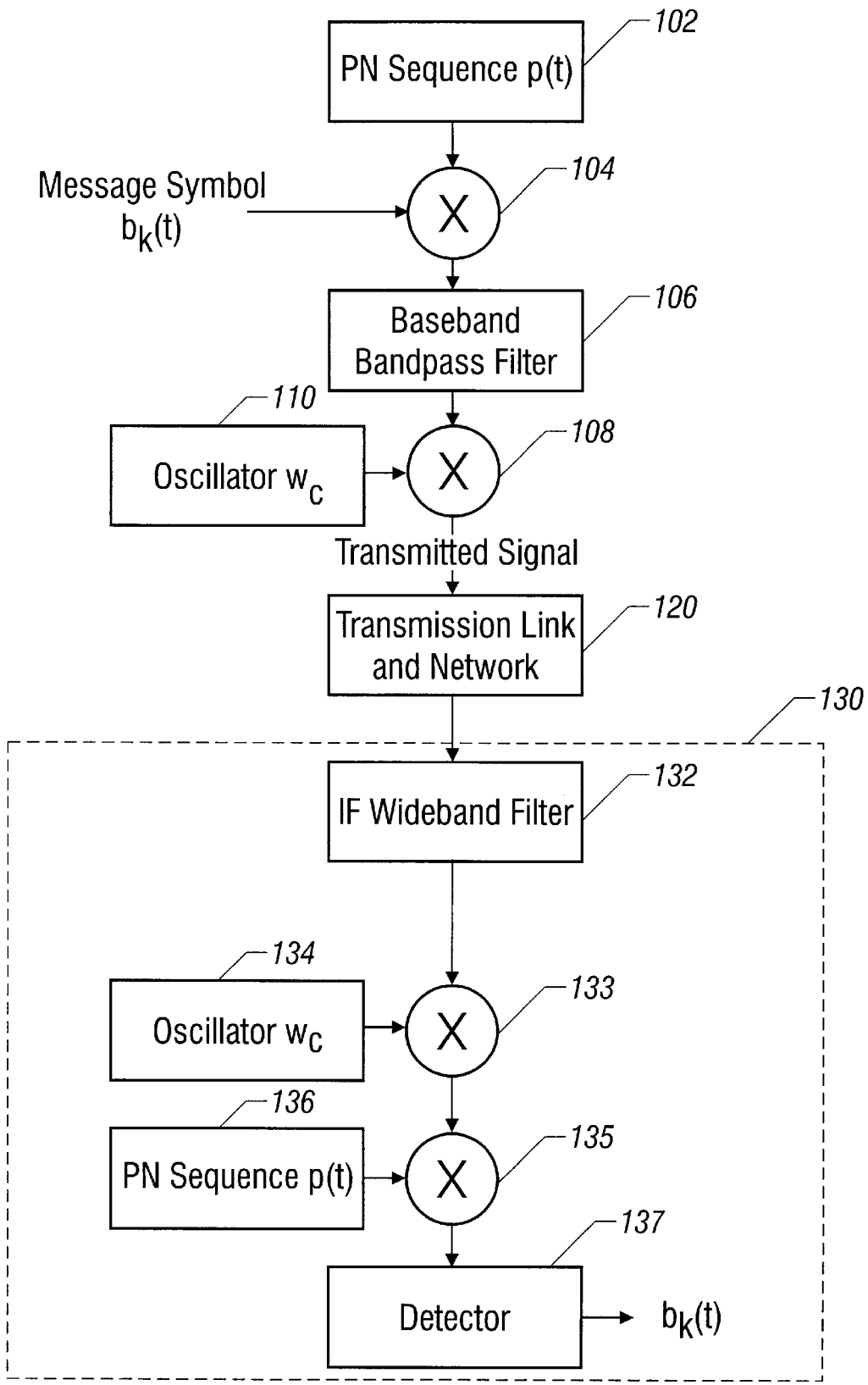
FIG. 1 shows a block diagram of a simplified CDMA system.
Figure 2A:
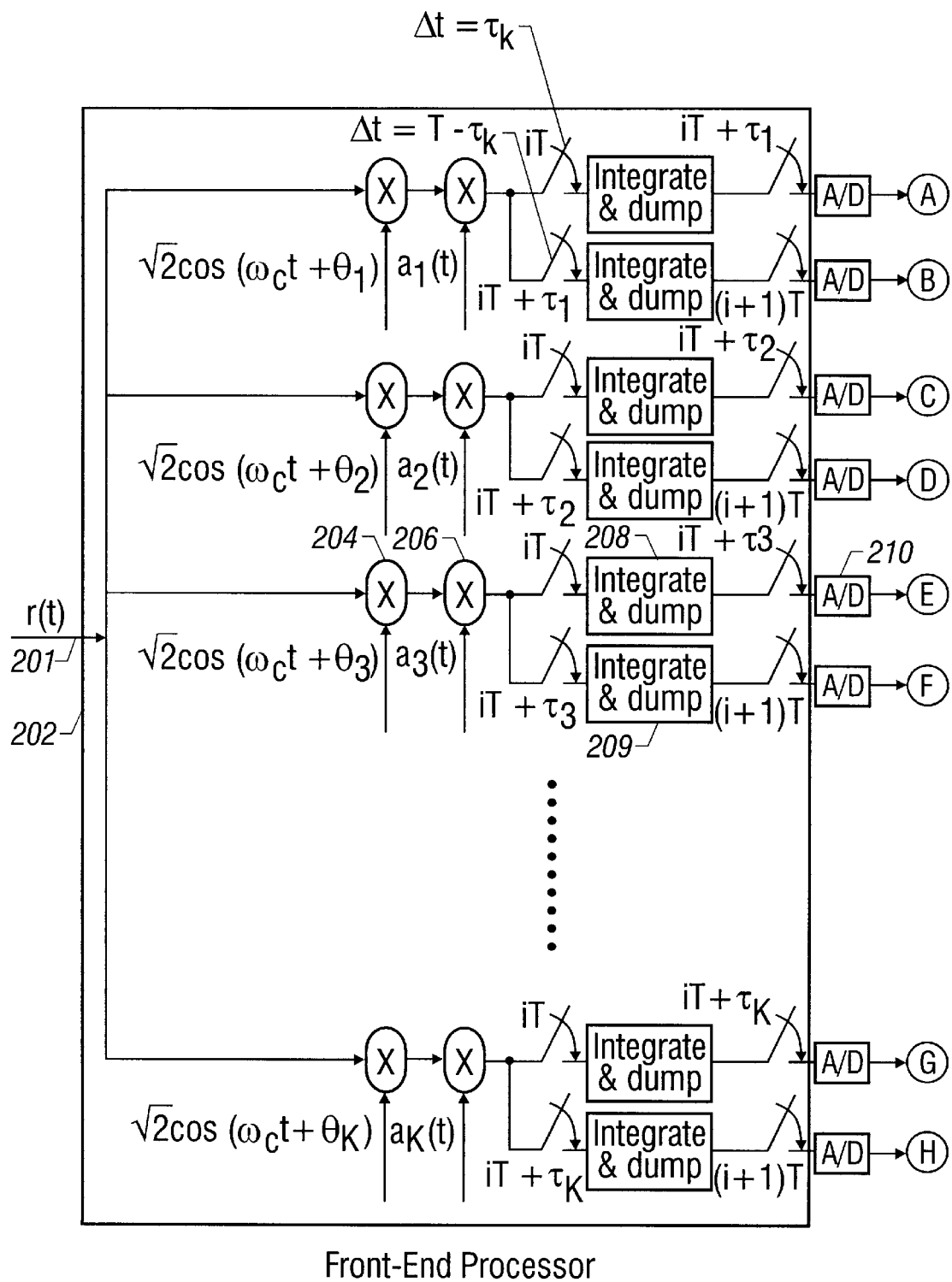
FIG. 2 shows the preferred embodiment of the multiuser detector of the present invention with a circuitry for the front-end processor.
Figure 2B:
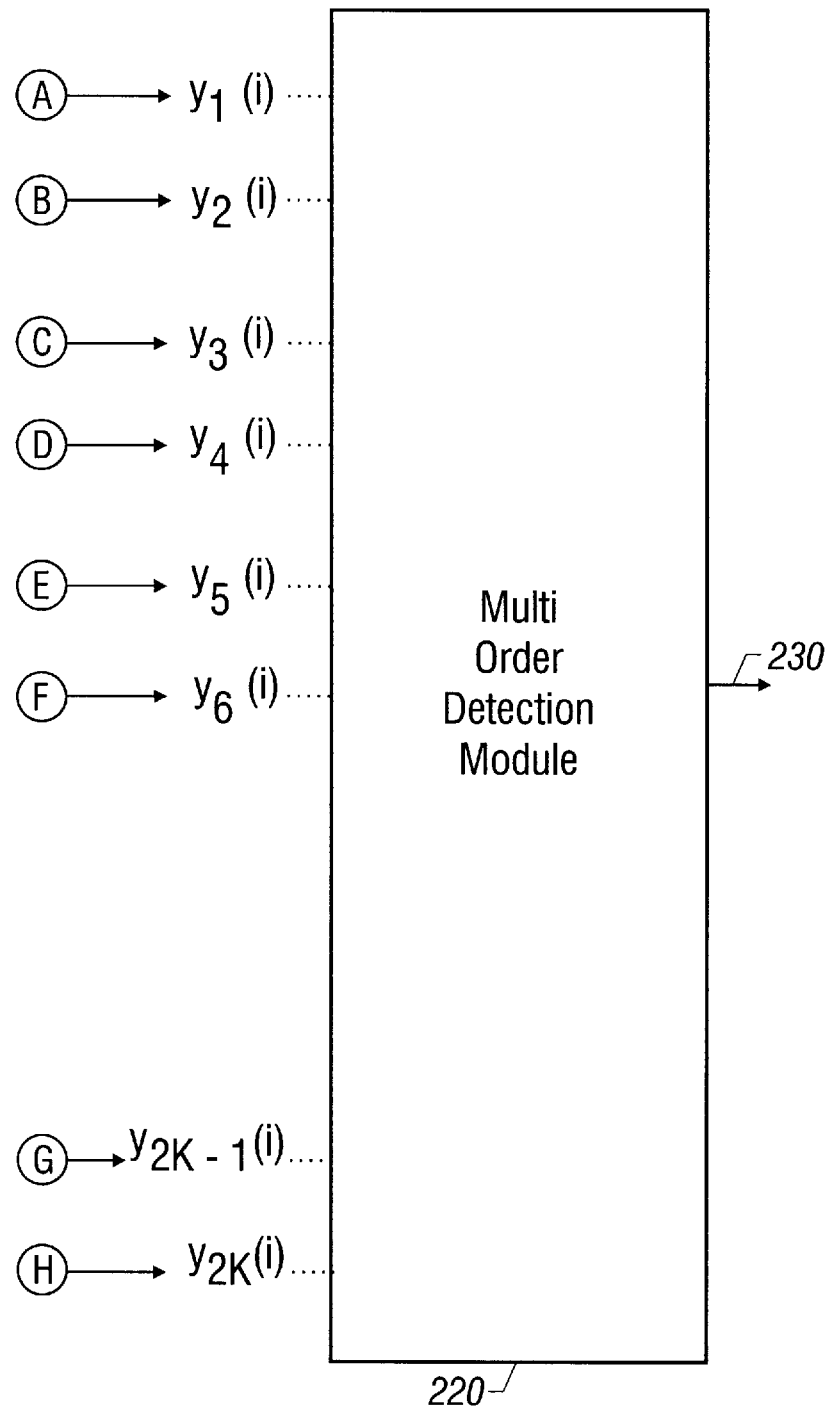

FIG. 2 shows the preferred embodiment 200 of the multiuser detector of the present invention with a circuitry for the front-end processor 202. The detector 200 is a portion of the receiving system in an asynchronous direct sequence spread-spectrum multiple access system that is also known as a CDMA system. There are K users operating in an additive white Gaussian noise (AWGN) environment. A received analog signal 201, r(t), at the input of the receiver is a sum of K spread-spectrum signals $s_k(t-\tau_k,b)$, wherein $1 \leq k \leq K$, and an AWGN random process, n(t), with two-sided power spectrum density $N_o/2$:

$$r(t) = s(t, b) + n(t), t \epsilon R \quad (1)$$

where $$s(t, b) = \sum_{k=1}^{K} s_k(t-\tau_k, b) = \sum_{i=0}^{L} \sum_{k=1}^{K} b_k(i) s_k(t - iT - \tau_k) \quad (2)$$

and $$s_k(t) = \sqrt{2w_k}\ a_k(t)\cos(\omega_c t + \theta_k). \quad (3)$$

In the above equations, T denotes the symbol length which is the same for each of the K users, $s_k(t)$ is the waveform transmitted by the kth user during a T-second interval, $a_k(t)$ is the kth user's spectral-spreading signal which is normalized to have unit power, $\tau_k$ is the time delay of the kth user, $\theta_k$ is the carrier phase of the kth user, $\omega_c$ is the common carrier frequency, $w_k$ is the power of the kth user which is assumed constant for each user during the observation, $b_k(i)$ is the ith transmitted data symbol of the kth user with $b_k(i)\epsilon\{-1,1\}$ for all k and i. and (L+1)T is the message length for each user.

Figure 3:
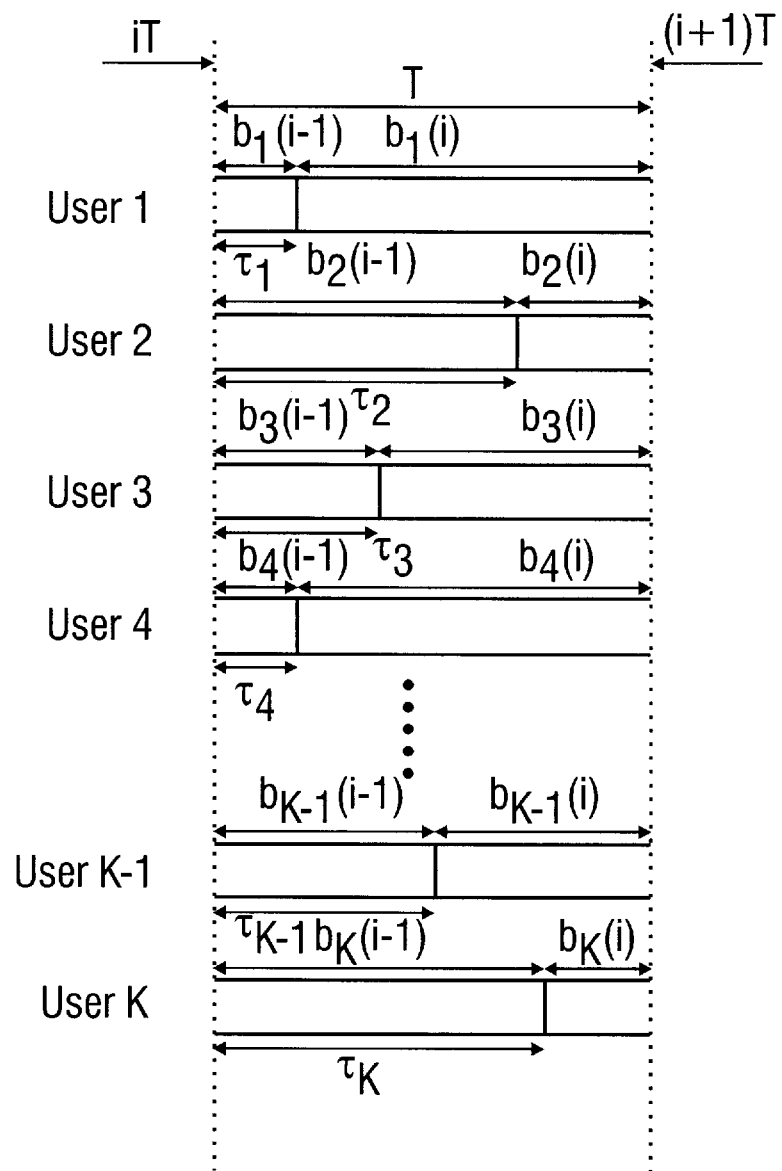
FIG. 3 illustrates the delay of each user signal and the corresponding transmitted data symbols during observation time from iT to (i+1)T.

FIG. 3 shows an example of the delay of each user and the corresponding transmitted data symbols during observation time from iT to (i+1)T.

A preprocessor (not shown in FIG. 2) including a plurality of matched filters processes the composite signal 201 and decomposes it into corresponding K components for each user. Each component is sampled in a respective sampling channel in the front-end processor 202 and converted into a digital signal by analog-to-digital converters 210. The output digital signals from the processor 202 are then subsequently decorrelated by the multiuser detection module 220 to recover the data symbols $b_k(i)$ from all K users embedded in the received signal 201.

The front-end processor 202 has K channels, one per user. Each channel includes a first signal mixer 204, a second signal mixer 206, and two parallel integrate-and-dump detectors 208 and 209. The signal mixer 204 is used to demodulate the received signal at a common carrier frequency $\omega_c$ generated by a local oscillator. The carrier phase $\theta_k$ (k=1,2, . . . K) for each user is determined by a process (which will be described herein) and used for the demodulation. The second mixer 206 mixes the PN sequence generated by the a local PN sequence generator with the received signal in each channel for further demodulation. When the carrier frequency $\omega_c$, the carrier phase $\theta_k$, the PN sequence epoch $a_k(t)$, and the symbol time for each user separately are synchronized through a synchronization process, the received signal r(t) is despread and demodulated by the local PN sequence and the local oscillator for each user. The K demodulated outputs are then double integrated, double sampled, and converted to 2K digital signals for post-end signal processing.

According to the present invention, each channel are preferably sampled twice by two integration processes with different integration times. The first integrate-and-dump detector 208 for user k integrates for a duration of $\tau_k$ from time iT to time iT+$\tau_k$, and outputs values $y_{2k-1}(i)$. The second integrate-and-dump detector 209 for the same user k integrates for a duration of $(T-\tau_k)$ from time iT+$\tau_k$ to time (i+1)T and outputs value $y_{2k}(i)$. Since each channel generates two output signals, a total of 2K signals are generated for K users by the double-sampling front-end processor 202. One advantage of this double sampling is to facilitate the implementation of the novel multi-order detection module 220 for minimizing the cross correlation interference and pipelined processing.

The digital output signals $y_{2k}(i)$ and $y_{2k-1}(i)$ can be used to form a vector y(i) of 2K dimension:

$$y(i) \triangleq \begin{bmatrix} y_1(i) \\ y_2(i) \\ y_3(i) \\ y_4(i) \\ \cdot \\ \cdot \\ \cdot \\ y_{2K-1}(i) \\ y_{2K}(i) \end{bmatrix} \quad (4)$$

Accordingly, the received data symbols $b_k(t)$ embedded in the received signal r(t) can also be defined in form of a vector z(i):

$$z(i) \triangleq \begin{bmatrix} \sqrt{w_1}\ b_1(i-1) \\ \sqrt{w_1}\ b_1(i) \\ \sqrt{w_2}\ b_2(i-1) \\ \sqrt{w_2}\ b_2(i) \\ \cdot \\ \cdot \\ \cdot \\ \sqrt{w_K}\ b_K(i-1) \\ \sqrt{w_K}\ b_K(i) \end{bmatrix} \quad (5)$$

Similarly, let vector $a_k(t,i)$ represent the waveform of the received PN sequence corresponding to y(i):

$$a(t, i) \triangleq \begin{bmatrix} a_1(t, i) \\ a_2(t, i) \\ \cdot \\ \cdot \\ \cdot \\ a_{2K-1}(t, i) \\ a_{2K}(t, i) \end{bmatrix} \quad (6)$$

-continued $$a_{2k-1}(t, i) = \begin{cases} a_k(t) & \text{if } iT \leq t < iT + \tau_k, \\ 0 & \text{otherwise,} \end{cases} \quad (7)$$

$$a_{2k}(t, i) = \begin{cases} a_k(t) & \text{if } iT + \tau_k \leq t < (i+1)T, \\ 0 & \text{otherwise,} \end{cases}$$

The correlation between $a_k(t,i)$ and $a_l(t,i)$ can be represented by $c_{kl}(i)$:

$$c_{kl}(i) = a_k(t, i) \cdot a_l(t, i) \triangleq \int_{iT}^{(i+1)T} a_k(t, i) \, a_l(t, i) dt. \quad (8)$$

A matrix $C(i)$ can be formed by $c_{kl}(i)$ to represent the correlation of the received PN sequence waveform:

$$C(i) = a(t,i) \cdot a'(t,i) \quad (9)$$

where $a'(t,i)$ is the transpose matrix of $a(t,i)$.

The inventor found that ignoring the additive white Gaussian noise term, $n(t)$, can simplify the description without affecting the functionability of the preferred embodiment. The double frequency terms can also be filtered by the integrate-and-dump detectors 208 and 209. Thus, neglect of the AWGN and elimination of the double frequency terms lead to the following:

$$y_{2k-1}(i) = \int_{iT}^{iT+\tau_k} r(t)\sqrt{2} \cos(\omega_{ct} + \theta_k)a_k(t)dt \quad (10)$$

$$= \sqrt{\omega_k} \, b_k(i-1)\frac{\tau_k}{T} +$$

$$\sum_{l=1,l\neq k}^{K} \sqrt{w_l} \, b_l(i-1)\cos(\theta_k - \theta_l)c_{(2k-1)(2l-1)}(i) +$$

$$\sum_{l=1,l\neq k}^{K} \sqrt{w_l} \, b_l(i)\cos(\theta_k - \theta_l)c_{(2k-1)(2l)}(i).$$

$$y_{2k}(i) = \sqrt{w_k} \, b_k(i)\left(1 - \frac{\tau_k}{T}\right) + \quad (11)$$

$$\sum_{l=1,l\neq k}^{K} \sqrt{w_k} \, b_l(i-1)\cos(\theta_K - \theta_l)c_{(2k)(2l-1)}(i) +$$

$$\sum_{l=1,l\neq k}^{K} b_l(i)\cos(\theta_K - \theta_l)c_{(2k)(2l)}(i).$$

The above two equations can be written in a vector form as $$R(i)z(i) = y(i), \quad (12)$$

where matrix $R(i) = \{r_{kl}(i)\}$ is given by $$r_{(2k-1)(2k-1)}(i) = \frac{\tau_k}{T},$$

$$r_{(2k)(2K)}(i) = 1 - \frac{\tau_k}{T},$$

$$r_{(2k-1)(2k)}(i) = 0,$$

$$r_{(2k)(2k-1)}(i) = 0,$$

$$r_{(2k-1)(2l-1)}(i) = \cos(\theta_k - \theta_l)c_{(2k-1)(2l-1)}(i), \quad (13)$$

$$r_{(2k-1)(2l)}(i) = \cos(\theta_k - \theta_l)c_{(2k-1)(2l)}(i),$$

$$r_{(2k)(2l-1)}(i) = \cos(\theta_k - \theta_l)c_{(2k)(2l-1)}(i),$$

$$r_{(2k)(2l)}(i) = \cos(\theta_k - \theta_l)c_{(2k)(2l)}(i),$$

$$r_{kl}(i) = r_{kl}(i).$$

Note that $r_{ll}(i)$ is independent of the data symbol index i, that is, $r_{ll}(i)$ is time invariant.

Equation (12) indicates that the received data vector $z(i)$ can be decorrelated from the sampled digital output vector $y(i)$ by the following operation:

$$z(i) = R(i)^{-1}y(i) \quad (14)$$

where $R(i)^{-1}$ is the inverse of $R(i)$.

Gaussian elimination is generally used to perform the operation of inversing a matrix. This is described, for example, by Strang in "Linear Algebra and Its Application", 3rd edition, Harcout Brace Jovanovich, 1988. The matrix $R(i)$ is a $2K \times 2K$ matrix. The Gaussian elimination is known to require a number of $[(2K)^3 - 2K]/3$ "multiply-subtract" operations in forward elimination, and a number of $(2K)^2/2$ "multiply-subtract" operations in back-substitution. Therefore, a total number of $$\frac{(2K)^3 - 2K}{3} + \frac{(2K)^2}{2}. \quad (15)$$

operations is required. However, this number is usually too large for real time processing even when 2K is moderate. In addition, Gaussian elimination requires at least 2K serial operations in forward elimination, and at least 2K serial operation in back-substitution. This implies that the computation time will be lower bounded because of the number of serial operations required.

The inventor recognized the limitations of the conventional Gaussian elimination method and thereby devised a new approach to perform the matrix inverse operation shown in Equation (14). This new approach utilizes the small off-diagonal components inherent in the matrix $R(i)$ to reduce the number of operations required by the Gaussian elimination. In particular, the reduced number of operations in this new approach can be implemented using parallel processing. The new approach in accordance with the present invention allows real-time processing of $z(i)$.

The multi-order detection module 220 of FIG. 2 is designed to perform the approximate operation shown in equation (14) to recover the data symbols represented by vector $z(i)$ from the sampled digital output vector $y(i)$. This new approach of obtaining $R(i)^{-1}$ described below.

Multi-Order Approximation Processing

The preferred embodiment decomposes the matrix $R(i)$ into two parts, a diagonal matrix $D=[d_{ll}]$ containing only the diagonal components of $R(i)$ and a matrix $O_f$ containing only the off-diagonal components of $R(i)$. This can be expressed as the following:

$$R = D + O_f. \quad (16)$$

with the following diagonal components $d_{ii}$:

$$d_{(2k-1)(2k-1)} = r_{(2k-1)(2k-1)} = \frac{\tau_k}{T} \quad (17)$$

$$d_{(2k)(2k)} = r_{(2k)(2k)} = 1 - \frac{\tau_k}{T}.$$

An approximation processing method is used in the preferred operation mode. A positive system control parameter $\delta > 0$ is introduced along with three matrices $D_\delta$, $O_\delta$, and $F_\delta$:

$$D_\delta = (1+\delta)D, \quad (18)$$

$O_\delta = O_f - \delta D$, $F_\delta = D_\delta^{-1} O_\delta$,

The parameter $\delta$ is dynamically adjusted based on the operation state of the CDMA system (i.e., the number of users in the system, the processing gain, and the allowable smallest integration time). The $\delta$-parameter usually changes with the number of users in the system. The choice of a non-zero $\delta$ is to ensure the convergence of the processing. Since the matrix $F_\delta$ for $\delta=0$ is not necessarily a convergent matrix. Optimization of $\delta$ parameter can increase the convergent speed. This will become apparent later.

The matrix R can be further decomposed in terms of $D_\delta$ and $F_\delta$:

$$\begin{aligned}
R &= D + O_f \qquad (19)\\
&= (1+\delta)D\left(I + \frac{1}{1+\delta} D^{-1}O_f\right) - \delta D\\
&= (1+\delta)D\left(I - \frac{\delta}{1+\delta} I + \frac{1}{1+\delta} D^{-1}O_f\right)\\
&= (1+\delta)D\left(I + \frac{1}{1+\delta}\left(D^{-1}O_f - \delta D\right)\right)\\
&= D_\delta(I + D_\delta^{-1}O_\delta)\\
&= D_\delta(I + F_\delta),
\end{aligned}$$

where I is an identity matrix. The equation (12) can be written as $$D_\delta(I + F_\delta)z = y. \qquad (20)$$

The preferred approximation operation can be further represented by a matrix $H^{(M)}$ and an estimated representation of the data symbol vector $z(i)$, $Z^{(M)} = [Z_l^{(M)}]$, both of which are defined as:

$$H^{(M)} \triangleq \left(\sum_{m=0}^{M} (-1)^m F_\delta^m\right) D_\delta^{-1}, \qquad (21)$$

$$\hat{Z}^{(M)} \triangleq H^{(M)} y.$$

The integer, $M = 0, 1, 2, 3, \ldots$, is the order of approximation processing.

The relation of $z(i)$ and $Z^{(M)}$ is given by:

$$\begin{aligned}
Z^{(M)} &= H^{(M)} y \qquad (22)\\
&= \left(\sum_{m=0}^{M} (-1)^m F_\delta^m\right) D_\delta^{-1} D_\delta(I + F_\delta)z\\
&= (I - (-1)^{M+1} F_\delta^{M+1})z\\
&= z - (-1)^{M+1} F_\delta^{M+1} z
\end{aligned}$$

Accordingly, the received data $b_k(i)$ can also be represented by an estimated $b_k^{(M)}(i)$. The estimated $b_k^{(M)}(i)$ can be determined by either $z_{2K}^{(M)}(i)$ or $z_{2K-1}^{(M)}(i+1)$.

A common practice in implementing CDMA systems is power control to ensure a substantially equal power distribution in the signals from K users. Implementation of such power control will be assumed herein, i.e., $w_k$ ($k=1, 2, \ldots, K$) for K users in Equation (3) is a constant denoted by w.

The inventor recognized that the integration times for obtaining digital output $y_{2k}(i)$ and $y_{2k-1}(i)$ for the kth user are different and therefore different weighting factors should be applied in combining the output signals $y_{2k}(i)$ and $y_{2k-1}(i)$ A combining ratio $\xi$ is therefore optimally obtained in implementing the approximation processing of $Z(i)$. This combining ratio significantly affects the performance of the multiuser detector 200 in accordance with the present invention. The optimized value, $\xi$, also called maximal signal combining ratio, is achieved through a zeroth order approximation but will be used for all of orders in the preferred embodiment of the present invention.

It will be shown that the maximal signal combining ratio $\xi$ is given by $(T-\tau_k)/T$. Therefore, the estimated $Z_{2K}^{(M)}(i)$ is weighted by $\xi=(T-\tau_k)/T$, while the estimated $Z_{2K-1}^{(M)}(i+1)$ is weighted by $(1-\xi)=\tau_k/T$. Accordingly, the received data estimated $b_k^{(M)}(i)$ for the kth user of the ith symbol can be expressed as $$b_k^{(M)}(i) = \frac{T-\tau_k}{T} \frac{1}{\sqrt{\omega}} \hat{z}_{2k}^{(M)}(i) + \frac{\tau_k}{T} \frac{1}{\sqrt{\omega}} \hat{z}_{2k-1}^{(M)}(i+1) \qquad (23)$$

The estimation noise $n_{bk}^{(M)}$ is defined as function of $F_\delta^m(i) = [f_{lj}^{(m)}(i)]$ by $$\begin{aligned}
n_{bk}^{(M)}(i) \triangleq -(-1)^{M+1} &\left(\frac{T-\tau_k}{T} \sum_{j=1}^{K} f_{(2k)(2j-1)}^{(M+1)}(i) b_j(i-1) + \right.\\
&\sum_{j=1}^{K} \left(\frac{T-\tau_k}{T} f_{(2k)(2j)}^{(M+1)}(i) + \frac{\tau_k}{T} f_{(2k-1)(2j-1)}^{(M+1)}(i+1)\right) b_j(i) =\\
&\left.\frac{\tau_k}{T} \sum_{j=1}^{K} f_{(2k-1)(2j)}^{(M+1)}(i+1) b_j(i+1)\right)
\end{aligned} \qquad (24)$$

The estimation noise $n_{bk}^{(M)}$ is the interference contribution from the cross correlation of the signals from all other (K–1) users except the kth user. Many prior-art CDMA systems simply neglect this estimation noise $n_{bk}^{(M)}$ as white noise in the background and consequently the resistance to the interference is compromised. This further adversely affects the maximal number of users that the CDMA system can handle simultaneously.

The multiuser detector 200 of the preferred embodiment uniquely processes the cross correlation information and operates to minimize the corresponding noise. One aspect of the present invention is to use the dynamically adjusted and optimized $\delta$ parameter to ensure the convergence of the estimation noise $n_{bk}^{(M)}$, i.e., $$E\{(n_{bk}^{(M+1)}(i))^2\} < E\{(n_{bk}^{(M)}(i))^2\} \quad \forall k, i \text{ and } M, \qquad (25)$$

where $E\{\ \}$ denotes the operation of expected value. In addition, the $\delta$ parameter is chosen to produce a fast convergence. Determination of the optimal $\delta$ value will be described hereafter. The estimation noise $n_{bk}^{(M)}$ contributes less variance to $b_k^{(M)}(i)$ as more orders of the approximation processing are performed if $\delta$ is properly chosen. The exact number of orders, M, for a particular CDMA system is determined by a desired symbol error rate of the system.

Define a new set of vectors $z^{(M,wt)}(i) = [z_1^{(M),wt}(i)]$, $x^{(M)}$, $s^{(M)}$ as the following:

$$\hat{z}^{(M),wt}(i) = D_{67}(i) H^{(M)}(i) y(i). \qquad (26)$$

$$x^{(M)} = (O_\delta D_\delta^{-1})^M y, \qquad (27)$$

$$s^{(M)} = \sum_{m=0}^{M} (-1)^m x^{(m)}.$$

The estimated $b_k^{(M)}(i)$ can be expressed as $$b_k^{(M)}(i) = \frac{T-\tau_k}{T} \frac{1}{\sqrt{w}} z_{2k}^{(M)}(i) + \frac{\tau_k}{T} \frac{1}{\sqrt{w}} z_{2k-1}^{(M)}(i+1) \quad (28)$$

$$= \frac{(1+\delta)(T-\tau_k)}{(1+\delta)T} \frac{1}{\sqrt{w}} z_{2k}^{(M)}(i) +$$

$$\frac{(1+\delta)\tau_k}{(1+\delta)T} \frac{1}{\sqrt{w}} z_{2k-1}^{(M)}(i+1)$$

$$= \frac{1}{\sqrt{w}(1+\delta)} (z_{2k}^{(M),wt}(i) + z_{2k-1}^{(M),wt}(i+1)),$$

The approximation method in accordance with the present invention can now be revealed by the equation (28), which includes the following steps:

1. Compute the vector $z^{(M),wt}(i)$ as follows:

$$z^{(M),wt}(i) = D_\delta(i)H^{(M)}(i)y(i) \quad (29)$$

$$= \left( \sum_{m=0}^{M} (-1)^m (O_\delta(i)D_\delta^{-1}(i))^m \right) y(i)$$

$$\triangleq \sum_{m=0}^{M} (-1)^m x^{(m)}$$

$$\triangleq S^{(M)}.$$

2. Determine values of $b_k^{(M)}(i)$ for the kth user as follows:

If $z_{2k}^{(M),wt}(i) + z_{2k-1}^{(M),wt}(i+1) > 0$, then $b_k^{(M)}(i) = +1$;

If $z_{2k}^{(M),wt}(i) + z_{2k-1}^{(M),wt}(i+1) \leq 0$, then $b_k^{(M)}(i) = -1$. \quad (30)

A recursion of $x^{(M)}$ and $s^{(M)}$ can be readily established from Equation (29):

$$x^{(M+1)} = O_\delta D_\delta^{-1} x^{(M)},$$

$$s^{(M+1)} = s^{(M)} + (-1)^{M+1} x^{(m+1)} \quad (31)$$

wherein $$x^{(0)} = y,$$

$$x^{(0)} = y. \quad (32)$$

Therefore, the estimated $z^{(M),wt}(i)$ in Mth order can be extracted from the (M−1)th order of $s^{(M-1)}$ according to Equation (29) and Equation (31).

Figure 4:
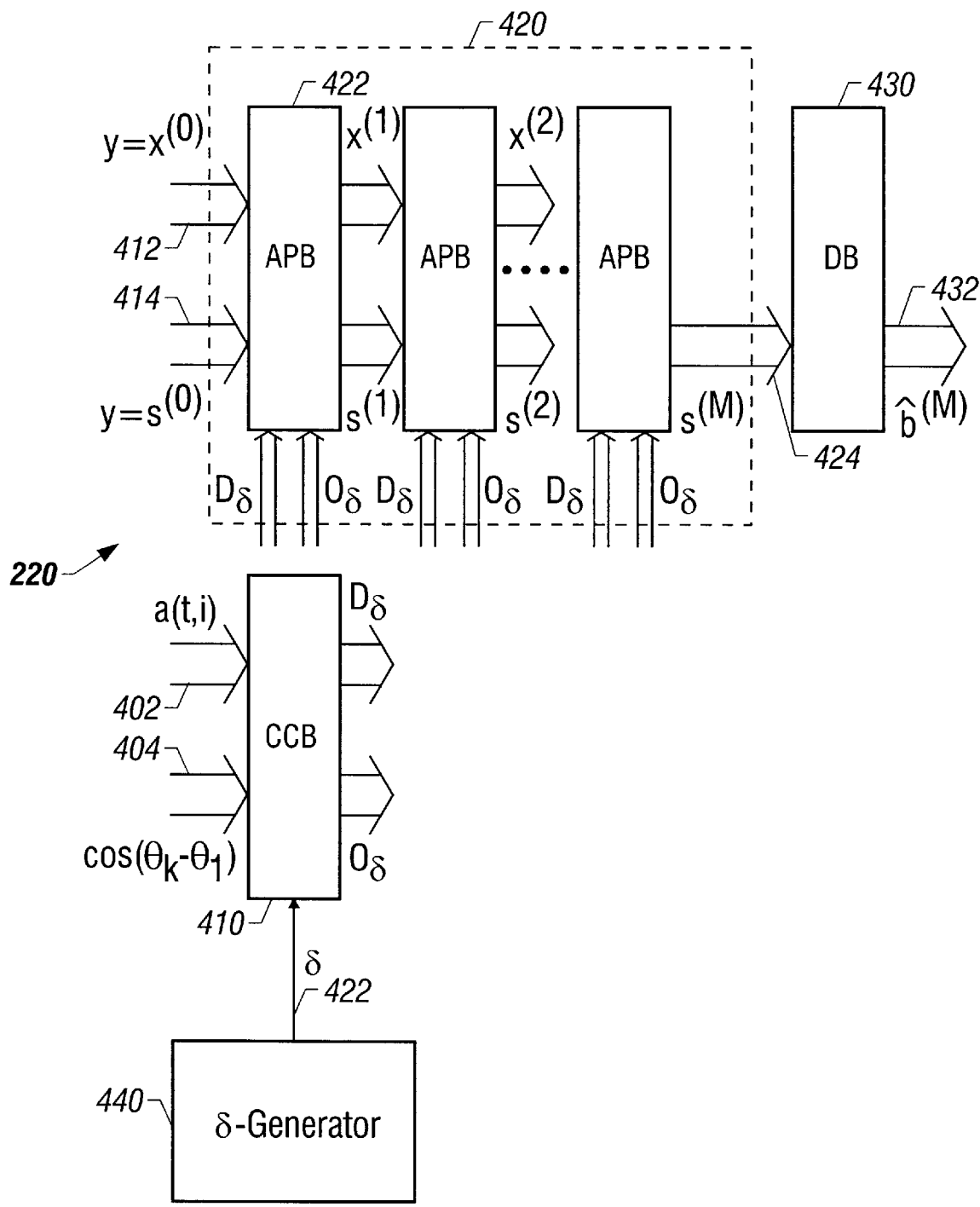
FIG. 4 shows the δ-adjusted Mth order detection module in accordance with the present invention.

FIG. 4 shows a preferred implementation of the multi-order detector module 220 in the detector 200. The detector module 220 includes multi-order approximation processing layers to implement the recursion processes in the above-described method. The detector module 220 includes four sections, a correlation processor 410, a δ-generator 440, an approximation processor block 420 having a plurality of approximation processors 422, and a decision processor 430.

The δ-generator 440 monitors the operation status of the CDMA system and produces a desired δ based on factors including the number of users, the processing gain, and the allowable smallest integration time. The optimized δ to the correlation processor 410 automatically changes with operation status of the CDMA system. This dynamic mechanism is to keep the processing efficiency and speed at optimal.

Figure 5:
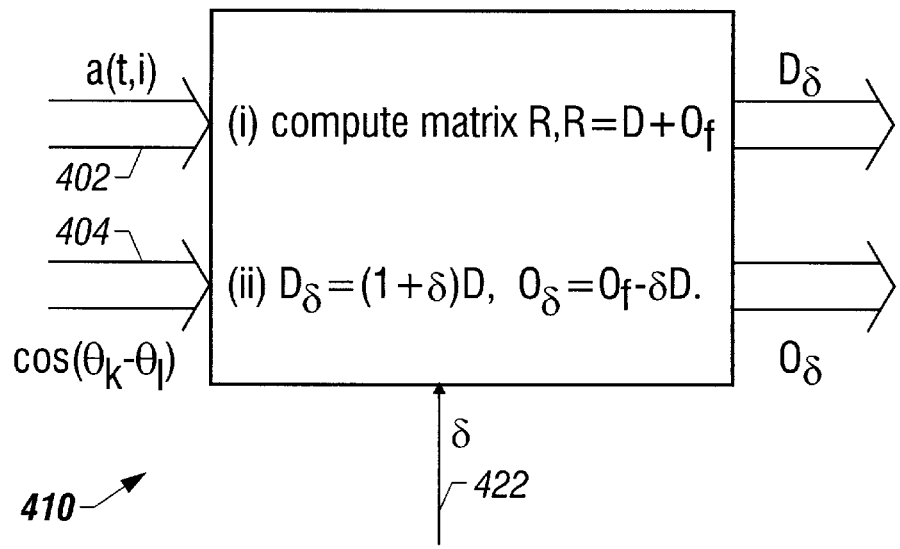
FIG. 5 shows the correlation processor.

The correlation processor 410 processes cross correlation information based on the PN sequence a(t,i) 402, a relative phase difference 404 between different users, i.e., cos ($\theta_k - \theta_l$), and the dynamically adjusted δ value 442. FIG. 5 further illustrates the main tasks performed by the correlation processor 410 including computing the matrix R(i), and computing the matrix $D_\delta$ and $O_\delta$. The information of the autocorrelation is included in the output matrix $D_\delta$ and the information of the cross correlation of different users is included in the output matrix $O_\delta$. Both output signals $D_\delta$ and $O_\delta$ are δ-dependent and thereby are dynamically adjusted to the status change of the CDMA system such as a change in the number of users.

Figure 6:
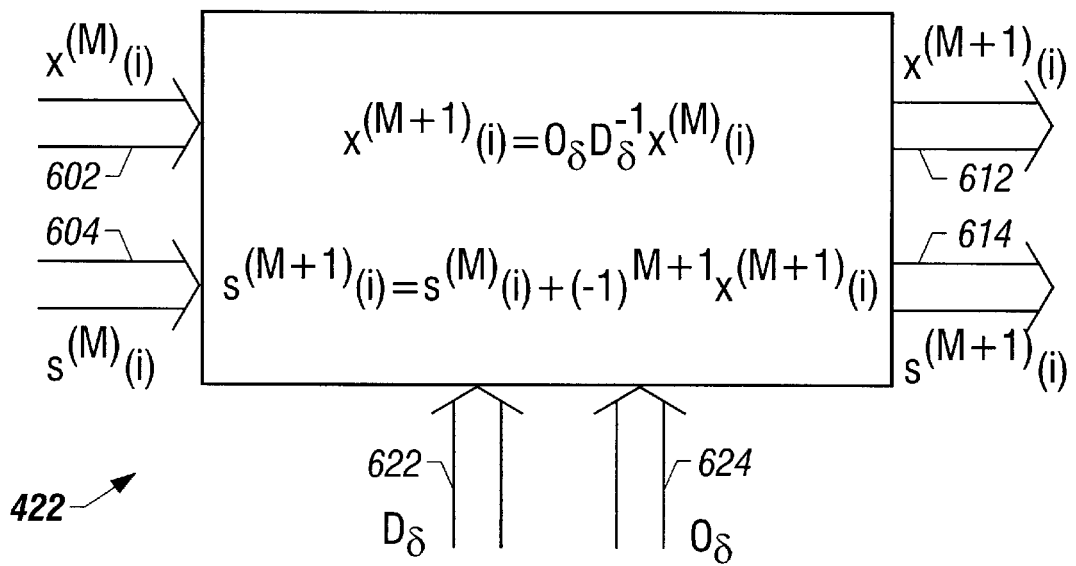
FIG. 6 shows the approximation processor in accordance with the present invention.

The output signals from the correlation processor 410 are fed to the approximation processor block 420 to generate an output $S^{(M)}$ 424 with a minimized interference. A plurality of substantially identical approximation processors 422 are connected in series relative to each other to form multiple processing stages. As described previously, the δ is so chosen to ensure fast convergence of the multi-order processing so that the estimation noise $n_{bk}^{(M)}$ decreases at a high speed as M increases. FIG. 6 further illustrates the operation of the approximation processor 422.

One unique feature of the approximation processor block 420 is the capability of continuous processing in a pipeline fashion. Each processor 422 at jth stage accepts and starts processing a new set of data from (j−1)th stage upon completion of feed previous set of data from (j−1)th stage to the next stage (j+1). Few prior-art systems implement such pipeline operation. The pipeline operation allows significant enhancement in processing efficiency and speed, thereby making the real-time implementation of multiuser detector feasible.

Figure 7:
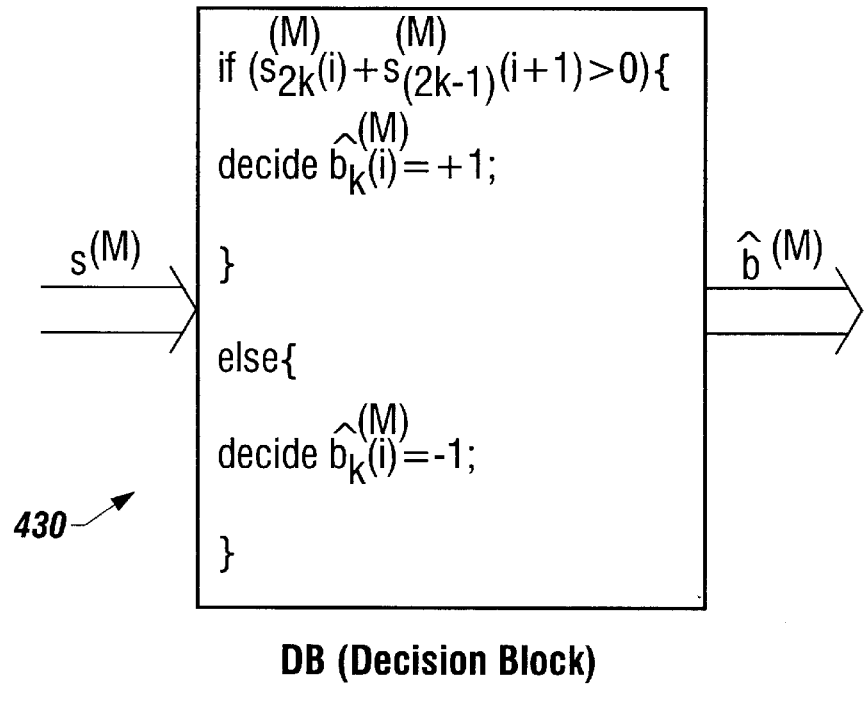
FIG. 7 shows the decision processor in accordance with the present invention.

The approximation processor block 420 feeds the resulting signal $s^{(M)}$ to the decision processor 430 if the noise level from the cross correlation is reduced below a pre-set tolerance level. The operation of the decision processor 430 is illustrated in FIG. 7.

The above-described processors and the operations thereof can be implemented with the existing electronic circuitry and VLSI technology (e.g., ASIC).

Correlation Processing and Correlation Matrix R

Signal detection by decorrelation operation is a known and widely used processing technique. The complexity of the decorrelation process usually increases significantly with the number of simultaneous users present in a CDMA system. The necessary processing or computation often makes real-time processing impractical with the current digital technology. The preferred embodiment uses a new and unobvious approach to reduce the complexity of the such decorrelation processing by processing the auto correlation and cross correlation in a unique way. This is partially shown in the correlation matrix R(i) that organizes the correlation information for further processing.

The correlation matrix R(i) is defined by Equations (12) and (13). Information about the matrix C(i) and $\cos(\theta_k - \theta_l)$ are needed in order to obtain the matrix R(i) at the receiver.

In CDMA technology, a symbol bit is spectrally spread by the spectral-spreading signal waveform of a square wave p(t). A single pulse of the PN waveform p(t) is called a chip. The chip duration $T_c$ determines the symbol processing gain N:

$$\text{Processing gain } N = \frac{T}{T_c} \quad (33)$$

Figure 8:
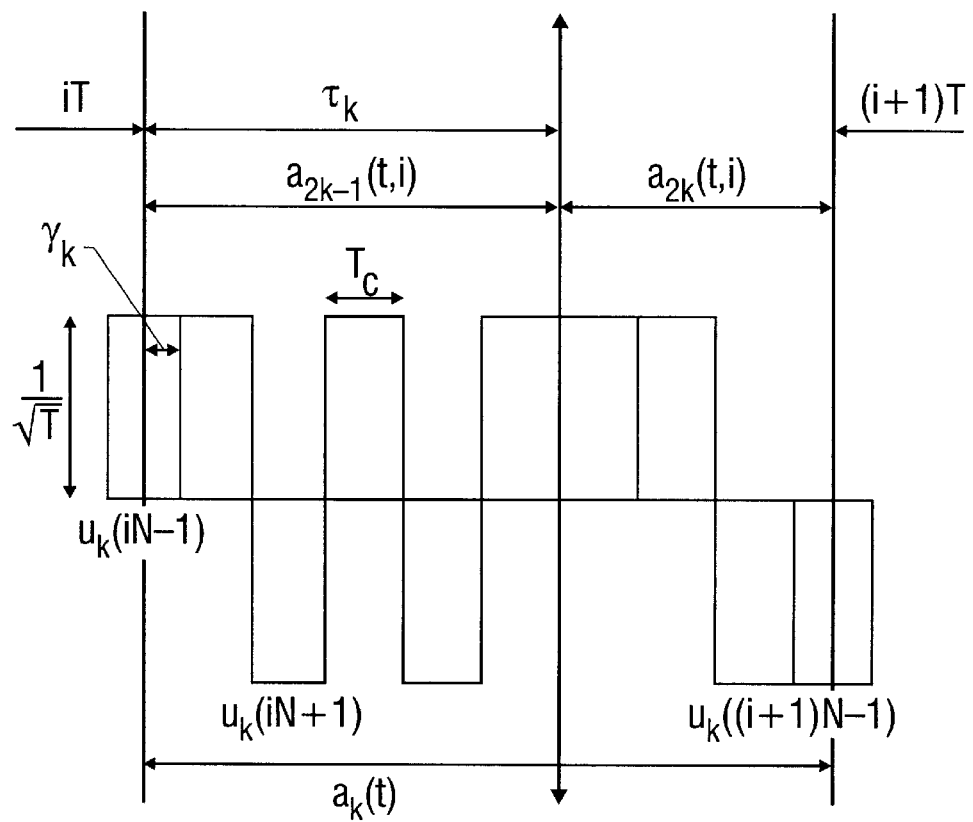
FIG. 8 illustrates the kth user's spectral-spreading signal, $a_k(t)$, during a observation time from iT to (i+1)T.

The spectral spreading signal for the kth user (normalized to have unit power), $a_k(t)$, over a T-second interval can be expressed as the following:

$$a_k(t) = \sum_{n=0}^{LN} \frac{1}{\sqrt{T}} u_k(n)p(t - nT_c - \gamma_k) \quad (34)$$

where $u_k(n)$ is the nth transmitted chip of the kth user with $u_k(n) \in \{-1, 1\}$ and $\gamma_k$ is the chip delay of the kth user where $\gamma_k = \tau_k \bmod T_c$. The waveform $a_k(t)$ is illustrated in FIG. 8.

The computation of the correlation matrix C(i) is preferably obtained digitally in accordance with the present invention. This is due to the special structure of the above spectral-spreading signal $a_k(t)$. A digital circuitry suitable for generating such function is well-known in the art. Digital generation provides higher stability than the analog counterparts at lower cost.

Let the chip sequence, $sh_k(i)$, of length N+1 for the kth user between time iT and (i+1)T be defined by $$sh_k(i) = \{u_k(iN-1), u_k(iN), u_k(iN+1), \ldots, u_k((i+1)N-1)\}. \quad (35)$$

Figure 9:
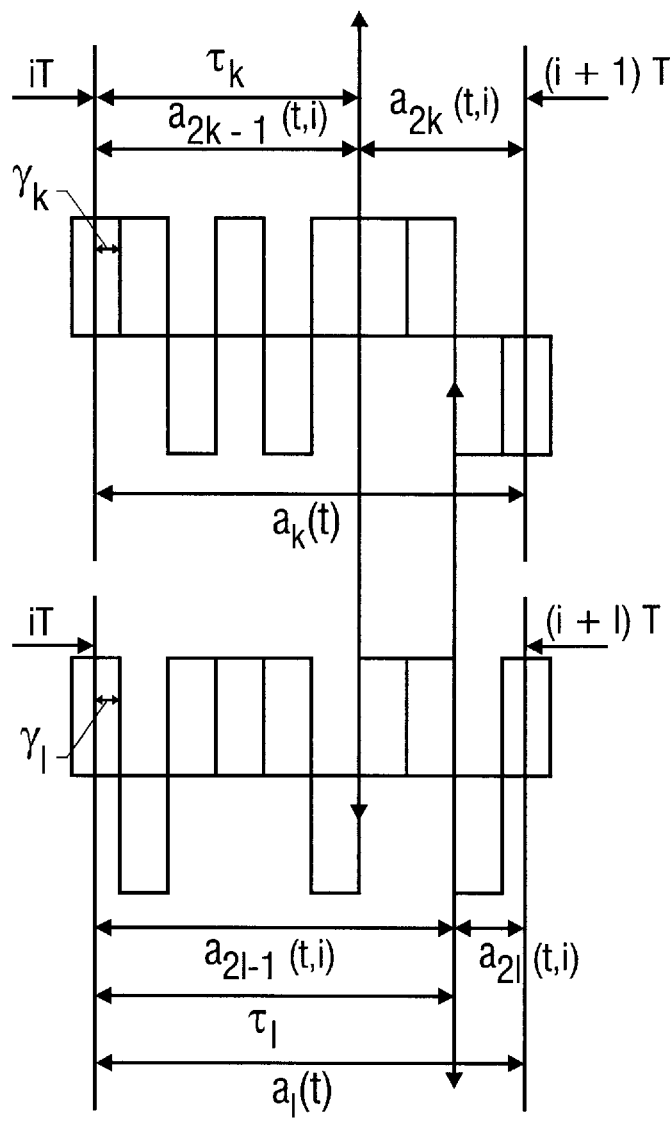
FIG. 9 shows the spectral-spreading signals, $a_k(t)$ and $a_l(t)$ for $\gamma_k=\gamma_l$ during a observation time from iT to (i+1)T.

In addition, let $sh_k^{RT}(i)$ denote the right-shifted version of $sh_k(i)$, that is, $$sh_k^{RT}(i) = sh_k(i) \to 1 \quad (36)$$
$$= \{u_k(iN-2), u_k(iN-1), u_k(iN), \ldots, u_k((i+1)N-2)\}$$

where $\to j$ denotes right-shift by j chips. If the chip delays $\gamma_k$ and $\gamma_l$ are both the same as shown in FIG. 9, then it is straightforward that $c_{(2k-1)(2l-1)}(i)$, $c_{(2k-1)(2l-1)}(i)$, $c_{(2k)(2l-1)}(i)$, and $c_{(2k)(2l)}(i)$ are functions of $sh_k(i) \oplus sh_l(i)$, $T_k$ and $T_l$, where $\oplus$ denotes the exclusive or operator. The calculation of $sh_k(i) \oplus sh_l(i)$ can be implemented in VLSI technology. This is well known in the art.

Furthermore, most of the computation involved in the above derivation is merely the sum of random +1 and −1 plus the fractional chip correlation at the edge. The sum of random +1 and −1 only takes a very small amount of computation time in digital signal processing. This is one reason the preferred embodiment uses digital implementation for generating R.

In the case that $\gamma_k > \gamma_l$, the preferred embodiment first operates to move $a_k(t)$ leftwards in time domain by an amount of $(\gamma_k - \gamma_l)$ to achieve chip alignment. This is to calculate the correlation values digitally. In this case, the correlation thus obtained is represented by $$C_{mn}^{LT}(i) \quad (37)$$

with m=2k−1, 2k and n=2l−1, 2l. The variable $c_{mn}^{LT}(i)$ is a function of $sh_k(i) \oplus sh_l(i)$.

Secondly, the preferred embodiment first operates to shift $a_k(t)$ rightwards in time by an amount of $T_c - (\gamma_k - \gamma_l)$ and the corresponding correlation thus obtained is represented by $$c_{mn}^{RT}(i), \quad (38)$$

in this case, $c_{mn}^{RT}(i)$ is a function of $sh_k^{RT}(i) \oplus sh_l(i)$. It is observed that the exact correlation value is given by $$c_{mn}(i) = \alpha_{kl} c_{mn}^{LT}(i) + (1 - \alpha_{kl}) c_{mn}^{RT}(i) \quad (39)$$

where $\alpha_{kl}$ is given by $$\alpha_{kl} = 1 - \left( \frac{\gamma_k}{T_c} - \frac{\gamma_l}{T_c} \right) \quad (40)$$

Figure 10:
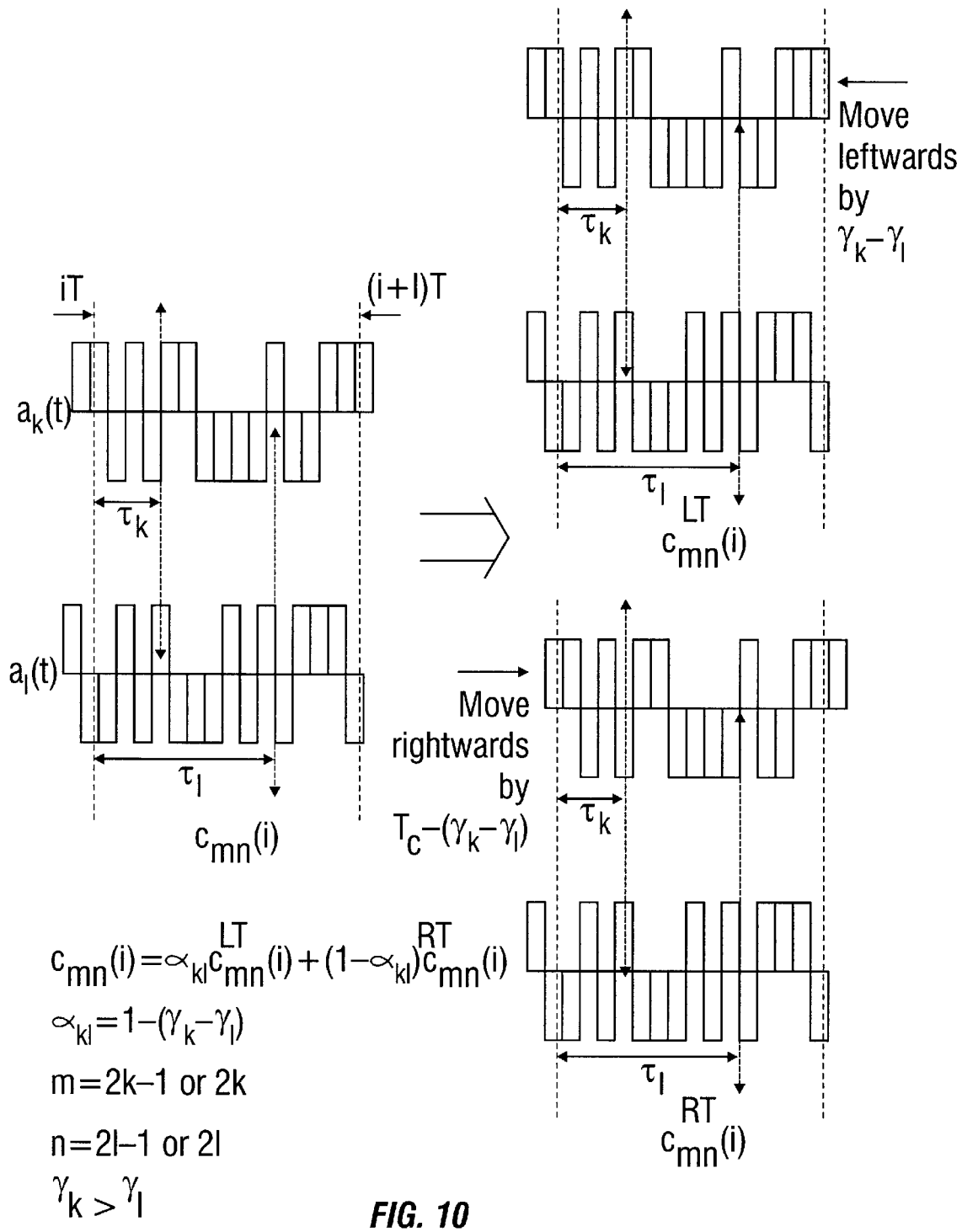
FIG. 10 illustrates computation of $c_{mn}(i)$ for $\gamma_k>\gamma_l$.

FIG. 10 illustrates the derivation of $c_{mn}(i)$ for $\gamma_k > \gamma_l$.

Similarly, when $\gamma_k < \gamma_l$, $a_k(t)$ is shifted first leftwards and then rightwards instead of moving $a_l(t)$. The corresponding correlation values thus obtained are denoted by $c_{mn}^{LT}(i)$ which is a function of $sh_l(i) \oplus sh_k(i)$ and $c_{mn}^{RT}(i)$ which is a function of $sh_l^{RT}(i) \oplus sh_k(i)$, respectively. Accordingly, the correlation value is given by $$c_{mn}(i) = \alpha_{kl} c_{mn}^{LT}(i) + (1 - \alpha_{kl}) c_{mn}^{RT}(i) \quad (41)$$

$$\alpha_{kl} = 1 - \left( \frac{\gamma_l}{T_c} - \frac{\gamma_k}{T_c} \right) \quad (42)$$

Figure 11:
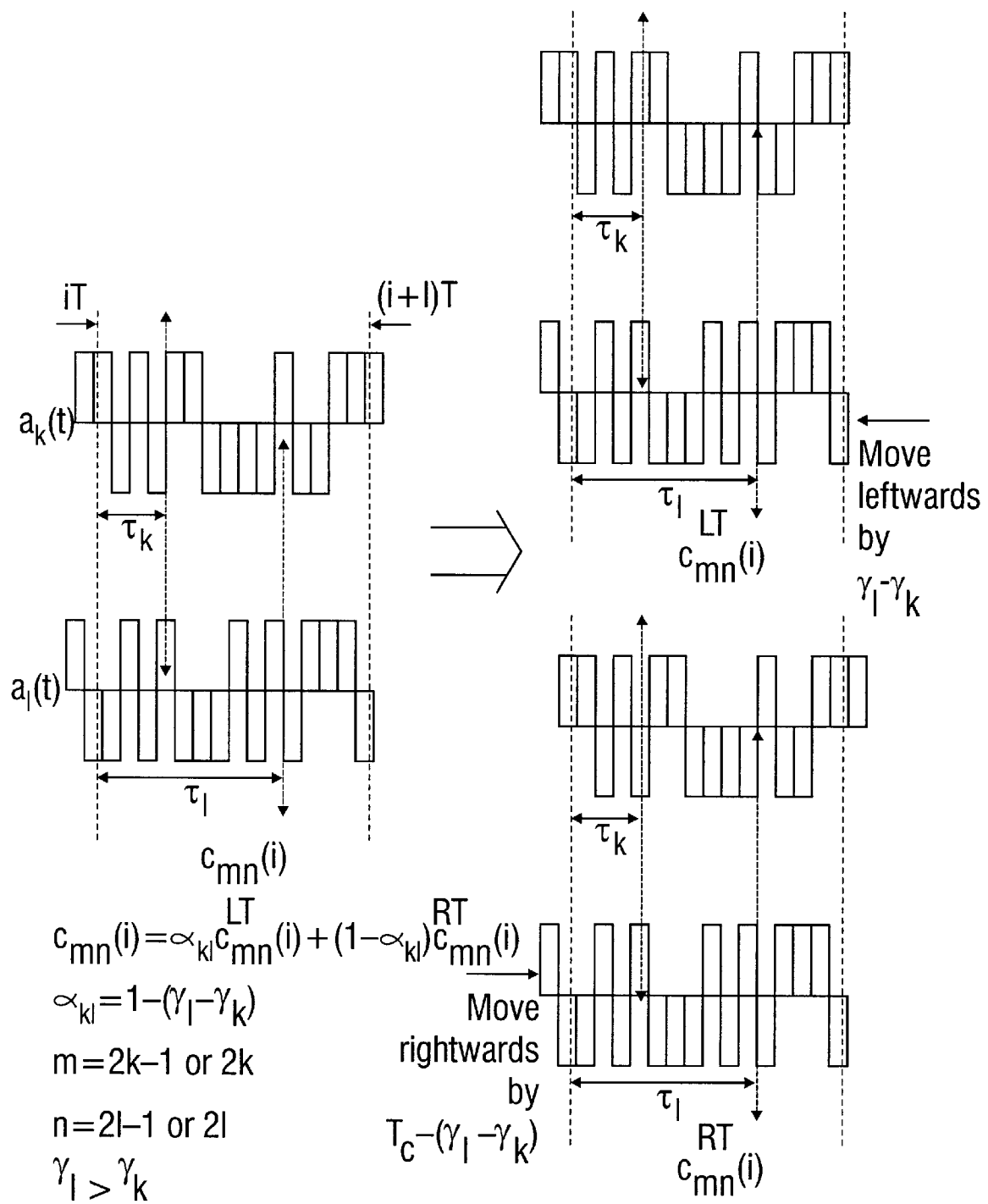
FIG. 11 illustrates computation of $c_{mn}(i)$ for $\gamma_k<\gamma_l$.

This process is illustrated in FIG. 11.

It is concluded from Equations (40)–(42) that the correlation value can be generalized as $$c_{mn}(i) = \alpha_{kl} c_{mn}^{LT}(i) + (1 - \alpha_{kl}) c_{mn}^{RT}(i) \quad (43)$$

with m=2k−1, 2k and n=2l−1, 2l, where $\alpha_{kl}$ has value given by $$\alpha_{kl} = 1 - \left| \frac{\gamma_l}{T_c} - \frac{\gamma_k}{T_c} \right|. \quad (44)$$

In addition, the ones with larger chip delay shall be moved rightwards and leftwards. The cornerstone of the proposed multiuser detector is that the derivation of $c_{mn}^{LT}(i)$ and $c_{mn}^{RT}(i)$ mostly are the sum of random +1 and −1. This particular feature makes the characteristics of the matrix R(i) readily obtainable digitally. Furthermore, a method of obtaining an approximation to the inverse of R(i) can be determined based on the characteristics of R(i).

Figure 12:
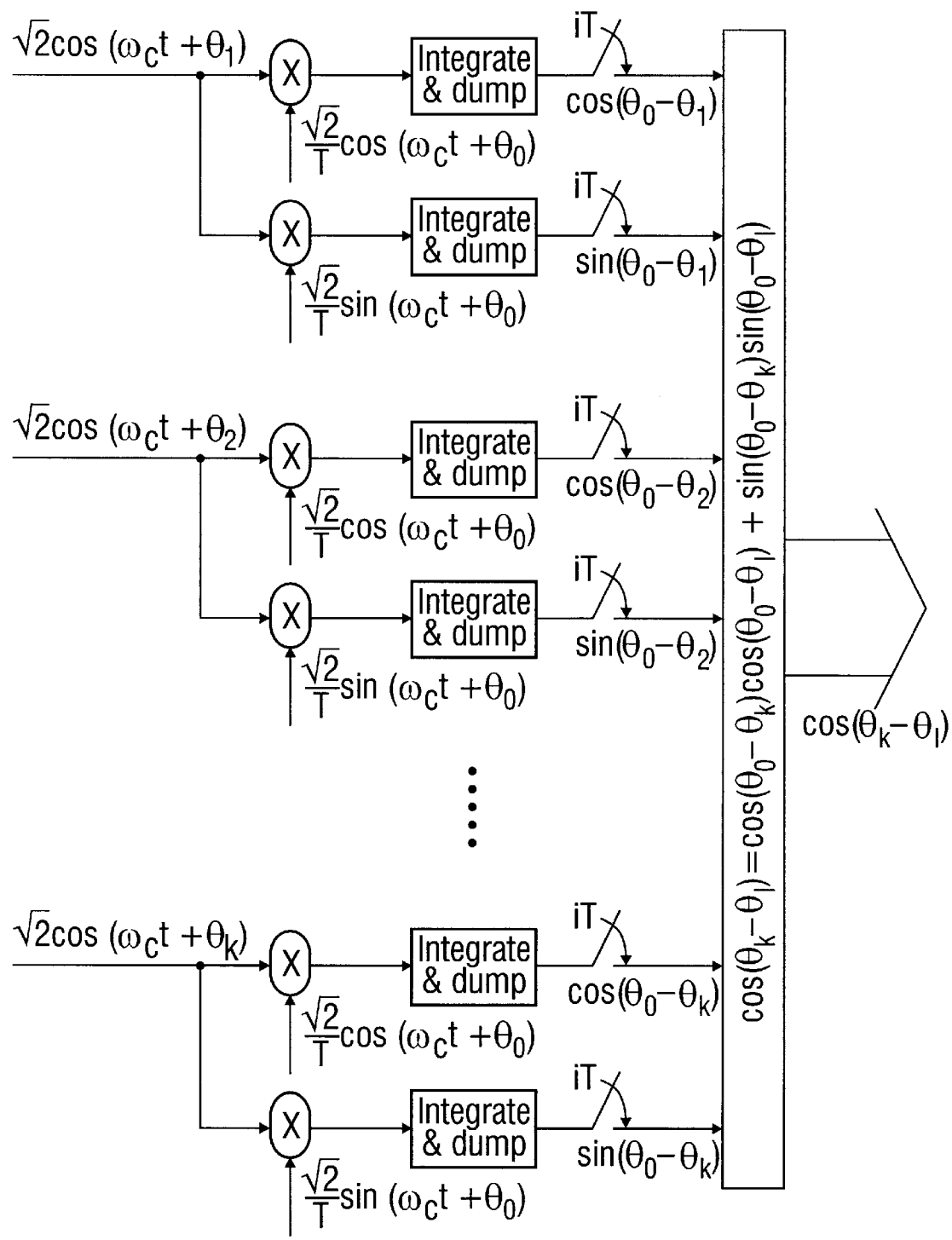
FIG. 12 shows the process and the corresponding circuitry for obtaining $\cos(\theta_k-\theta_l)$.

FIG. 12 illustrates the circuitry and method for generation of cos ($\theta_k - \theta_l$) that are implemented in the preferred embodiment. A reference signal at the local oscillator frequency $\omega_c$ with a common reference phase $\theta_0$ (an arbitrary real number) is generated for all K users in the CDMA system. It is again assumed that the integration process will filter out all the terms with double frequency.

For the purpose of more concise notation, the system time index will be omitted mostly thereafter. Moreover, only time invariant symbol delays are considered.

Figure 13:
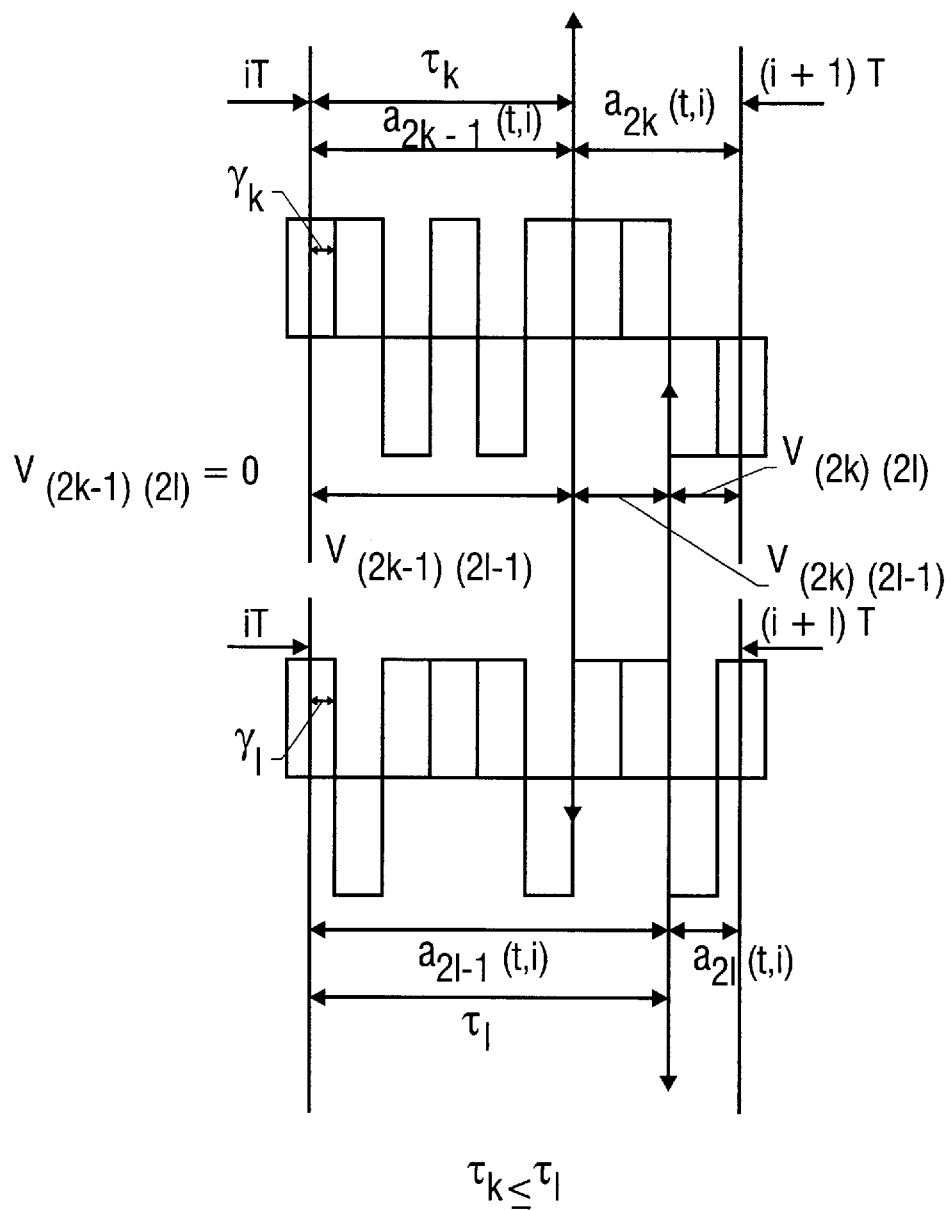
FIG. 13 shows the magnitude of $V_{(2k-1)(2l-1)}$, $V_{(2k-1)(2l)}$, $V_{(2k)(2l-1)}$, $V_{(2k)(2l)}$ when $\gamma_k \leq \gamma_l$.

Define Vmn as the time overlap between $a_n(t,i)$ and $a_m(t,i)$ in unit of chips. FIG. 13 illustrates examples of $V_{(2k-1)(2l-1)}$, $V_{(2k-1)(2l-1)}$ and $V_{(2k)(2l)}$.

From Equation (13), it is observed that with time invariant symbol delay, the components $r_{(2k-1)(2k-1)}$, $r_{(2k)(2k)}$, $r_{(2k-1)(2k)}$, and $r_{(2k)(2k-1)}$ for $k=1$ to K, are all constants with values of $$r_{(2k-1)(2k-1)} = \frac{\tau_k}{T} = \frac{V_{(2k-1)(2k-1)}}{N}, \quad (45)$$

$$r_{(2k)(2k)} = 1 - \frac{\tau_k}{T} = \frac{V_{(2k)(2k)}}{N},$$

$$r_{(2k-1)(2k)} = 0,$$

$$r_{(2k)(2k-1)} = 0.$$

Whereas, Equation (13) and Equation (43) indicate that $r_{(2k-1)(2l-1)}$ is a random variable with a value given by $$r_{(2k-1)(2l-1)} = \cos(\theta_k - \theta_l) c_{(2k-1)(2l-1)} \quad (46)$$
$$= \cos(\theta_k - \theta_l)(\alpha_{kl} c_{(2k-1)(2l-1)}^{LT} + (1 - \alpha_{kl}) c_{(2k-1)(2l-1)}^{RT}).$$

In general, the probability distribution of $\theta_k$ and $\alpha_{kl}$, and the relationship among random variables $\theta_k$, $\theta_l$, $c_{(2k-1)(2l-1)}$, $\alpha_{kl}$, $c^{LT}_{(2k-1)(2l-1)}$, $c^{RT}_{(2k-1)(2l-1)}$ can be summarized as follows:

1. The random variable $\theta_k$ and $\theta_l$ are independent and identically distributed with uniform distribution between $-\pi$ and $\pi$, and they are independent of $c_{(2k-1)(2l-1)}$;

2. The random variable $\alpha_{kl}$ is uniformly distributed between 0 and 1, and is independent of $c^{LT}_{(2k-1)(2l-1)}$ and $c^{RT}_{(2k-1)(2l-1)}$.

The moments of $\cos(\theta_k - \theta_l)$ and $\alpha_{kl}$ can easily be calculated with the above relation:

$$E\{\cos(\theta_k - \theta_l)\} = 0, \quad (47)$$

$$E\{\cos^2(\theta_k - \theta_l)\} = \frac{1}{2},$$

$$E\{\cos^4(\theta_k - \theta_l)\} = \frac{3}{4},$$

$$E\{\alpha_{kl}\} = \frac{1}{2},$$

$$E\{\alpha_{kl}^2\} = \frac{1}{3},$$

$$E\{\alpha_{kl}^4\} = \frac{1}{5},$$

Assuming the chips in a PN sequence is independent identical distribution ("i.i.d") with equal probability to be +1 or −1, then the moments of $c^{LT}_{(2k-1)(2l-1)}$ and $c^{RT}_{(2k-1)(2l-1)}$ can be derived as shown in the following:

$$E\{c^{LT}_{(2k-1)(2l-1)}\} = E\{c^{RT}_{(2k-1)(2l-1)}\} = 0, \quad (48)$$

$$E\{(c^{LT}_{(2k-1)(2l-1)})^2\} = E\{(c^{RT}_{(2k-1)(2l-1)})^2\} \approx \frac{1}{N^2} V_{(2k-1)(2l-1)},$$

$$E\{(c^{LT}_{(2k-1)(2l-1)})^4\} = E\{(c^{RT}_{(2k-1)(2l-1)})^4\}$$

$$\approx \frac{1}{N^4}(3V^2_{(2k-1)(2l-1)} - 2V_{(2k-1)(2l-1)}).$$

and $$E\{c^{LT}_{(2k-1)(2l-1)} c^{RT}_{(2k-1)(2l-1)}\} = 0, \quad (49)$$

$$\{(c^{LT}_{(2k-1)(2l-1)})^2 (c^{RT}_{(2k-1)(2l-1)})^2\} = \frac{1}{N^4} V^2_{(2k-1)(2l-1)},$$

$$\{(c^{LT}_{(2k-1)(2l-1)})^1 (c^{RT}_{(2k-1)(2l-1)})^3\} = E\{(c^{LT}_{(2k-1)(2l-1)})^3 (c^{RT}_{(2k-1)(2l-1)})^1\}$$

$$= 0,$$

Therefore, the moments of $r_{(2k-1)(2l-1)}$ and $r_{lk}$ are given by $$E\{r_{(2k-1)(2l-1)}\} = 0, \quad (50)$$

$$E\{r^2_{(2k-1)(2l-1)}\} = \frac{1}{3N^2} V_{(2k-1)(2l-1)},$$

$$E\{r^4_{(2k-1)(2l-1)}\} = \frac{1}{N^4}\left(\frac{54}{40} V^2_{(2k-1)(2l-1)} - \frac{3}{10} V_{(2k-1)(2l-1)}\right);$$

and $$E\{r_{lk}\} = 0, \quad (51)$$

$$E\{r^2_{lk}\} = \frac{1}{3N^2} V_{lk},$$

$$E\{r^4_{lk}\} = \frac{1}{N^4}\left(\frac{55}{40} V^2_{lk} - \frac{3}{10} V_{lk}\right).$$

Matrix $F_\delta$ represents information of the off-diagonal elements of the correlation matrix $R(i)$. $F_\delta$ is $\delta$ dependent and allows optimal control of the correlation processing in minimizing the interference. Each components in $F_\delta$ and $F_\delta^2$ can be expressed as $$f^{(1)}_{kk} = -\frac{\delta}{1+\delta}, \quad (52)$$

$$f^{(1)}_{kk} = \frac{\delta}{1+\delta} \frac{r_{kl}}{r_{kk}} \quad \text{for } k \neq 1,$$

$$f^{(2)}_{kk} = -\frac{1}{(1+\delta)^2}\left(\delta^2 + \sum_{j=1, j \neq k}^{2K} \frac{r^2_{kj}}{r_{kk}r_{jj}}\right),$$

$$f^{(2)}_{kl} = \frac{1}{(1+\delta)^2}\left(-\delta r_{kl}\left(\frac{1}{r_{kk}} + \frac{1}{r_{ll}}\right) + \sum_{j=1, j \neq k, j \neq l}^{2K} \frac{r_{kj}r_{jl}}{r_{kk}r_{jj}}\right),$$

for $k \neq l$.

The first and second moment of $f_{kk}^{(1)}$, $f_{kl}^{(1)}$, $f_{kk}^{(2)}$, and $f_{kl}^{(2)}$ can be computed as follows:

$$E\{f^{(1)}_{kk}\} = -\frac{\delta}{1+\delta}, \quad (53)$$

$$E\{f^{(1)}_{kl}\} = 0,$$

$$E\{f^{(2)}_{kk}\} = -\frac{1}{(1+\delta)^2}\left(\delta^2 + \sum_{j=1, j \neq k}^{2K} \frac{1}{3} \frac{V_{kj}}{V_{kk}V_{jj}}\right),$$

$$E\{f^{(2)}_{kl}\} = 0,$$

$$E\{(f^{(1)}_{kk})^2\} = \frac{\delta^2}{(1+\delta)^2},$$

$$E\{(f^{(1)}_{kl})^2\} = \frac{1}{3} \frac{1}{(1+\delta)^2} \frac{V_{kl}}{V^2_{kk}},$$

$$E\{(f^{(2)}_{kk})^2\} = \frac{1}{(1+\delta)^4}\left(\left(\delta^2 + \frac{1}{V_{kk}} \sum_{j=1, j \neq k}^{2K} \frac{1}{3} \frac{V_{kj}}{V_{jj}}\right)^2 + \frac{1}{V^2_{kk}} \sum_{j=1, j \neq k}^{2K} \left(\frac{446}{360} \frac{V^2_{kj}}{V^2_{jj}}\right)\right),$$

$$E\{(f^{(2)}_{kl})^2\} = \frac{1}{(1+\delta)^4}\left(\frac{1}{3} \delta^2 V_{kl}\left(\frac{1}{V_{kk}} + \frac{1}{V_{ll}}\right)^2 + \sum_{j=1, j \neq k, j \neq l}^{2K} \frac{1}{9} \frac{V_{kj}}{V^2_{kk}} \frac{V_{jl}}{V^2_{jj}}\right)$$

The following relation is observed in obtaining the above results:

$$E\{r_{kj}^2 r_{km}^2\} = E\{r_{kj}^2\} E\{r_{km}^2\}. \quad (54)$$

Determination of Maximal Signal-Combining Ratio

The maximal signal combining algorithm dictates the performance of the proposed system. Due to the complexity that is involved in deriving the combining ratio, the maximal signal combining ratio is calculated only for the zeroth order multiuser detector. The same combining ratio will be used for other orders of multiuser detector. Although such weighting ratio does not guarantee the maximal estimation signal-to-noise ratio for $M \geq 1$, it avoids the totally intractable computation that can be involved. Furthermore, as M increases, the estimation noise will be dominant by the adjustment $\delta$ instead of the combining ratio $\xi$, therefore, it is desirable to use the zeroth order combining ratio for all of the orders.

Suppose the estimation $b_k^{(M)}(i)$ is generated by $$b_k^{(M)}(i) = \xi \frac{1}{\sqrt{w}} Z_{2k}^{(M)}(i) + (1-\xi) \frac{1}{\sqrt{w}} Z_{2k-1}^{(M)}(i+1) \quad (55)$$

$$\triangleq b_k(i) + n_{b_{k,\xi}^{(M)}}(i)$$

where the estimation noise $n_{bk}^{(M)}(i)$ is given by $$n_{b_{k,\xi}^{(M)}}(i) \triangleq -(-1)^{M+1} \left( \xi \sum_{j=1}^{K} f_{(2k)(2j-1)}^{M+1}(i) b_j(i-1) + \right. \qquad (56)$$

$$\sum_{j=1}^{K} (\xi f_{(2k)(2j)}^{(M+1)}(i) + (1-\xi) f_{(2k-1)(2j-1)}^{(M+1)}(i+1)) b_j(i) +$$

$$\left. (1-\xi) \sum_{j=1}^{K} f_{(2k-1)(2j)}^{(M+1)}(i+1) b_j(i+1) \right).$$

Then the zeroth order multiuser detector will have estimation signal-to-noise ratio, $SNR^{(0), k}(i)$, given by $$SNR^{(0),k}(i) \triangleq \frac{E\{b_k^2(i)\}}{E\{(n_{b_{k,\xi}^{(0)}}(i))^2\}} = \frac{1}{\rho^{(0)}}, \quad (57)$$

$$\rho^{(0)} = \sum_{j=1}^{K} (E\{(\xi f_{(2k)(2j-1)}^{(1)}(i))^2\} + \qquad (58)$$

$$E\{(\xi f_{(2k)(2j)}^{(1)}(i))^2\} + 2\xi(1-\xi) E\{f_{(2k)(2j)}^{(1)}(i)\} E\{f_{(2k-1)(2j-1)}^{(1)}(i+1)\} +$$

$$E\{((1-\xi) f_{(2k-1)(2j-1)}^{(1)}(i+1))^2\} + E\{((1-\xi) f_{(2k-1)(2j)}^{(1)}(i+1))^2\}) =$$

$$\frac{1}{(1+\delta)^2} \left( \delta^2 + \frac{1}{3} \frac{K-1}{N} \left( \frac{\xi^2}{\frac{V_{(2k)(2k)}}{N}} + \frac{(1-\xi)^2}{1 - \frac{V_{(2k)(2k)}}{N}} \right) \right).$$

Maximizing $SNR^{(0)\ k}(i)$ is equivalent to minimizing $\rho^{(o)}$ which in turn is equivalent to minimizing the following term:

$$\frac{\xi^2}{\frac{V_{(2k)(2k)}}{N}} + \frac{(1+\xi)^2}{1 - \frac{V_{(2k)(2k)}}{N}}. \quad (59)$$

which reaches its minimum value at $\xi_{max}$:

$$\xi_{max} = \frac{V_{(2k)(2k)}}{N}. \quad (60)$$

This is the same signal combining ratio that is used in Equations (23) and (24), i.e., $(T-\tau_k)/T$.

Although a similar procedure can be done for the second order multiuser detector to find the maximal signal combining ratio, it turns out that the combining ratio is a very complicated function of $V_{kk}$ for i=1, 2, 3, . . . , and 2K. Likewise, it is infeasible to calculate the precise $v^{(M)}$ for $M \geq 2$ which implies that the exact maximal combining ratio is very difficult to obtain for $M \geq 2$. Therefore, the maximal combining ratio of the zeroth order detector will be used for other orders as well.

Moreover, as M increases, the multiuser detector 200 relies on the adjustment $\delta$ to reduce the impact from $n_{bk}^{(M)}(i)$ instead of the combining ratio $\xi$.

Estimation Noise Variance $\sigma^{(M),k}$ and Optimization of $\delta$

As discussed previously, the estimated $b_k^{(M)}(i)$ and the estimation noise $n_{bk}^{(M)}(i)$ are related by $b_k^{(M)}(i) = b_k(i) + n_{bk}^{(M)}(i)$ given by $$n_{b_k}^{(M)}(i) = -(-1)^{M+1} \left( \frac{T-\tau_k}{T} \sum_{j=1}^{K} f_{(2k)(2j-1)}^{(M+1)}(i) b_j(i-1) + \right. \qquad (61)$$

$$\sum_{j=1}^{K} \left( \frac{T-\tau_k}{T} f_{(2k)(2j)}^{(M+1)}(i) + \frac{\tau_k}{T} f_{(2k-1)(2j-1)}^{(M+1)}(i+1) \right) b_j(i) +$$

$$\left. \frac{\tau_k}{T} \sum_{j=1}^{K} f_{(2k-1)(2j)}^{(M+1)}(i+1) b_j(i+1) \right) =$$

$$-(-1)^{M+1} \sum_{j=1}^{K} \left( \frac{T-\tau_k}{T} f_{(2k)(2j-1)}^{(M+1)}(i) b_j(i-1) + \right.$$

$$\left( \frac{T-\tau_k}{T} f_{(2k)(2j)}^{(M+1)}(i) + \frac{\tau_k}{T} f_{(2k-1)(2j-1)}^{(M+1)}(i+1) \right) b_j(i) +$$

$$\left. \frac{\tau_k}{T} f_{(2k-1)(2j)}^{(M+1)}(i+1) b_j(i+1) \right)$$

$\sigma^{(M),k}$ is defined as the estimation noise variance for user k that is generated by the Mth order multiuser detector:

$$\sigma_{(m),k} \triangleq E\{(n_{b_k}^{(M)}(i))^2\} = \qquad (62)$$

$$E\left\{ \left( -(-1)^{M+1} \sum_{j=1}^{K} \left( \frac{T-\tau_k}{T} f_{(2k)(2j-1)}^{(M+1)}(i) b_j(i-1) + \right. \right. \right.$$

$$\left( \frac{T-\tau_k}{T} f_{(2k)(2j)}^{(M+1)}(i) + \frac{\tau_k}{T} f_{(2k-1)(2j-1)}^{(M+1)}(i+1) \right) b_j(i) +$$

$$\left. \left. \left. \frac{\tau_k}{T} f_{(2k-1)(2j)}^{(M+1)}(i+1) b_j(i+1) \right) \right)^2 \right\} =$$

$$\sum_{j=1}^{K} \left( E\left\{ \left( \frac{T-\tau_k}{T} f_{(2k)(2j-1)}^{(M+1)}(i) \right)^2 \right\} + \right.$$

$$E\left\{ \left( \frac{T-\tau_k}{T} f_{(2k)(2j)}^{(M+1)}(i) \right)^2 \right\} +$$

$$2\frac{\tau_k}{T} \frac{T-\tau_k}{T} E\{f_{(2k)(2j)}^{(M+1)}(i)\} E\{f_{(2k-1)(2j-1)}^{(M+1)}(i+1)\} +$$

$$E\left\{ \left( \frac{\tau_k}{T} f_{(2k-1)(2j-1)}^{(M+1)}(i+1) \right)^2 \right\} +$$

$$\left. E\left\{ \left( \frac{\tau_k}{T} f_{(2k-1)(2j)}^{(M+1)}(i+1) \right)^2 \right\} \right) \triangleq \sum_{j=1}^{K} \sigma_j^{(M),k},$$

where $\sigma^{(M),k}$ denotes the estimation noise variance contributed by user j to user k in the Mth order muitiuser detector and is given by $$\sigma_j^{(j),k} \triangleq E\left\{ \left( \frac{T-\tau_k}{T} f_{(2k)(2j-1)}^{(M+1)}(i) \right)^2 \right\} + \qquad (63)$$

$$E\left\{ \left( \frac{T-\tau_k}{T} f_{(2k)(2j)}^{(M+1)}(i) \right)^2 \right\} +$$

$$2\frac{\tau_k}{T} \frac{T-\tau_k}{T} E\{f_{(2k)(2j)}^{(M+1)}(i)\} E\{f_{(2k-1)(2j-1)}^{(M+1)}(i+1)\} +$$

-continued $$E\left\{\left(\frac{\tau_k}{T} f^{(M+1)}_{(2k-1)(2j-1)}(i+1)\right)^2\right\} + E\left\{\left(\frac{\tau_k}{T} f^{(M+1)}_{(2k-1)(2j)}(i+1)\right)^2\right\}.$$

The order of the expectation and the summation in Equation (62) is exchangeable, because the received data of different users are independent relative to each other. Also, it is assumed that the received data are equally likely to be +1 or −1, that the random variable $f_{kl}^{(M)}(i)$ is independent to the received data $b_j(i)$, and that the random matrix $F_{67}^{(M)}(i)$ is independent of the random matrix $F\delta^{(M)}(1)$ when $i \neq 1$.

Since the first and second moments of $F_\delta$ and $F_\delta^2$ are available in Equation (53), $\sigma_j^{(0),k}$ and $\sigma_j^{(1),k}$ can be derived as the following:

$$\delta_k^{(0),k} = \frac{\delta^2}{(1+\delta)^2} \tag{64}$$

$$\delta_{j,j\neq j}^{(0),k} = \frac{1}{3N} \frac{1}{(1+\delta)^2},$$

$$\delta_k^{(1),k} \approx \frac{1}{(1+\delta)^4}\left(\delta^2 + \frac{2}{3}\frac{K}{N}\right)^2,$$

$$\delta_{j,j\neq k}^{(1),k} = \frac{1}{(1+\delta)^4}\left(\frac{1}{N^2}\frac{2}{9}(K-2) + \frac{1}{N}\frac{\delta^2}{3}g\left(\frac{V_{(2k-1)(2k-1)}}{N}, \frac{V_{(2j-1)(2j-1)}}{N}\right)\right).$$

wherein $$g\left(\frac{V_{(2k-1)(2k-1)}}{N}, \frac{V_{(2j-1)(2j-1)}}{N}\right) \triangleq \tag{65}$$

$$\frac{V_{(2k)(2j-1)}}{N}\left(1 + \frac{\frac{V_{(2k)(2k)}}{N}}{\frac{V_{(2j-1)(2j-1)}}{N}}\right)^2 +$$

$$\frac{V_{(2k)(2j)}}{N}\left(1 + \frac{\frac{V_{(2k)(2k)}}{N}}{\frac{V_{(2j-1)(2j-1)}}{N}}\right)^2 +$$

$$\frac{V_{(2k-1)(2j-1)}}{N}\left(1 + \frac{\frac{V_{(2k-1)(2k-1)}}{N}}{\frac{V_{(2j-1)(2j-1)}}{N}}\right)^2 +$$

$$\frac{V_{(2k-1)(2j)}}{N}\left(1 + \frac{\frac{V_{(2k-1)(2k-1)}}{N}}{\frac{V_{(2j)(2j)}}{N}}\right)^2.$$

Special attention should be given to the user-independent second moment of the estimation noise, $\sigma_j^{(0),k}$ and $\sigma_j^{(1),k}$, when $\delta=0$. This particular structure happens when the proposed maximal signal combining algorithm is used.

The optimal value of $\delta$ for order M is the one that achieves the minimum estimation noise variance from all users, i.e., $$\delta_{opt}^{(M)} = \left\{\delta: \min_\delta \sum_{k=1}^{K} \sigma^{(M),k}\right\}. \tag{66}$$

Equation (64) indicates that the complexity of the estimation noise variance as a function of $\delta$ increases as the order increases. Therefore, it is very difficult to find an optimal value of $\delta$ for all orders.

The multiuser detector 200 of preferred embodiment instead searches for a $\delta$ which assures the fast convergence of the estimation noise. Moreover, the optimal value of $\delta$ should not be order-dependent or symbol-delay-dependent in order to reduce the implementation complexity.

Using Equation (62), it is found that the upper bound to the estimation noise variance is given by $$\sigma^{(M),k} = \sum_{j=1}^{K}\left(E\left\{\left(\frac{T-\tau_k}{T} f^{(M+1)}_{(2k)(2j-1)}(i)\right)^2\right\} + \tag{67}\right.$$

$$E\left\{\left(\frac{t-\tau_k}{T} f^{(M+1)}_{(2k)(2j)}(i)\right)^2\right\} +$$

$$2\frac{\tau_k}{T}\frac{T-\tau_k}{T} E\{f^{(M+1)}_{(2k)(2j)}(i)\}E\{f^{(M+1)}_{(2k-1)(2j-1)}(i+1)\} +$$

$$E\left\{\left(\frac{\tau_k}{T} f^{(M+1)}_{(2k-1)(2j-1)}(i+1)\right)^2\right\} +$$

$$E\left\{\left(\frac{\tau_k}{T} f^{(M+1)}_{(2k-1)(2j)}(i+1)\right)^2\right\} \leq$$

$$2\frac{\tau_k}{T}\frac{T-\tau_k}{T} E\{f^{(M+1)}_{(2k)(2k)}(i)\}E\{f^{(M+1)}_{(2k-1)(2k-1)}(i+1)\} +$$

$$\sigma^{(0),k}\sum_{j=1}^{2K}\sum_{l=1}^{2K} E\{f^{(M)}_{lj}\}$$

wherein $E\{f_{kl}^{(M)}\}=0$ for $k \neq 1$.

When M is a moderately large number, the first term in Equation (67) will be much smaller than the second term when the estimation noise variance is a decreasing function of $\delta$, i.e., $$2\frac{\tau_k}{T}\frac{T-\tau_k}{T} E\{f^{(M+1)}_{(2k)(2k)}(i)\}E\{f^{(M+1)}_{(2k-1)(2k-1)}(i+1)\} << \tag{68}$$

$$\sigma^{(0),k}\sum_{j=1}^{2K}\sum_{l=1}^{2k} E\{f_{ij}^M\}.$$

Therefore, the upper bound of the estimation noise variance $\sigma^{(M),k}$ can be approximated by $$\sigma_{upper}^{(M),k} \approx \sigma^{(0),k}\sum_{j=1}^{2K}\sum_{l=1}^{2K} E\{f_{lj}^{(M)}\}. \tag{69}$$

Similarly, we can also derive the upper bound to the estimation noise variance $\sigma^{(M+1),k}$:

$$\sigma_{upper}^{(M+1),k} \approx \sigma^{(1),k}\sum_{j=1}^{2K}\sum_{l=1}^{2K} E\{f_{lj}^{(M)}\}. \tag{70}$$

It is desirable to find a $\delta$ value so that $$\delta_{opt} = \left\{\delta: \min_\delta \frac{\sum_{k=0}^{K} \sigma^{M+1,k}}{\sum_{k=0}^{K} \sigma^{(M),k}}\right\}, \tag{71}$$

which will allow the optimal decrease of estimation noise between two consecutive processing stages in the approximation processor block 420 shown in FIG. 4.

Since the close form of $\sigma^{(M),k}$ is very difficult to find, the $\delta$-generator 440 shown in FIG. 4 is thus configured to obtain the optimal $\delta_{opt}$ by the following criterion instead, $$\delta_{opt} = \left\{ \delta: \min_{\delta} \frac{\sum_{k=0}^{K} \sigma_{upper}^{(M+1),k}}{\sum_{k=0}^{K} \sigma_{upper}^{(M),k}} \right\} \quad (72)$$

$$= \left\{ \delta: \min_{\delta} \frac{\sum_{k=0}^{K} \sigma^{(1),k}}{\sum_{k=0}^{K} \sigma^{(0),k}} \right\}$$

The apability of serving a large number of simultaneous users is one of the advantages of a CDMA system. Therefore, it is reasonable to assume that the number of users, K, is much larger than 1, i.e., K>>1. This assumption is used in the description herebelow.

The ratio of the estimation noise variance of the first order to that of the zeroth order for the kth user can be found as $$\beta_k \triangleq \frac{\sigma^{(1),k}}{\sigma^{(o),k}} \quad (73)$$

$$\beta_k = \frac{\sigma^{(1),k}}{\sigma^{(0),k}} = \frac{\sum_{j=1}^{K} \sigma_j^{(1),k}}{\sum_{j=1}^{K} \sigma_j^{(0),k}} \quad (74)$$

$$\approx \frac{\left(\delta^2 + \frac{2}{3}\frac{K}{N}\right)^2 + \frac{2}{9}\left(\frac{K}{N}\right)^2 + \frac{1}{3}\delta^2\frac{K}{N}\bar{g}_k}{\left(\delta^2 + \frac{1}{3}\frac{K}{N}\right)(1+\delta)^2},$$

wherein $$\bar{g}_k = \frac{1}{K} \sum_{j=1,j\neq k}^{K} g\left(\frac{V_{(2k-1)(2k-1)}}{N}, \frac{V_{(2j-1)(2j-1)}}{N}\right). \quad (75)$$

It is desirable that $\beta_k$ is less than 1 for all k in order to assure convergence of the preferred multiuser detector 200 in FIG. 2.

For the general case, $\delta$ shall satisfy:

$$\frac{\left(\delta + \frac{2}{3}\frac{K}{N}\right)^2 + \frac{2}{9}\left(\frac{K}{N}\right)^2 + \frac{1}{3}\delta^2\frac{K}{N}\bar{g}_k}{\left(\delta^2 + \frac{1}{3}\frac{K}{N}\right)(1+\delta)^2} < 1, \forall k, \quad (76)$$

$$\left(\delta^2 + \frac{2}{3}\frac{K}{N}\right)^2 +$$

$$\frac{2}{9}\left(\frac{K}{N}\right)^2 + \frac{1}{3}\delta^2\frac{K}{N}\bar{g}_k < \left(\delta^2 + \frac{1}{3}\frac{K}{N}\right)(1+\delta)^2,$$

$$\delta^3 + \left(\frac{1}{2} - \frac{K}{2N} + \frac{1}{6}\frac{K}{N}\bar{g}_k\right)\delta^2 +$$

$$\frac{1}{3}\frac{K}{N}\delta + \frac{1}{6}\frac{K}{N} - \frac{1}{3}\left(\frac{K}{N}\right)^2 > 0.$$

The lower limit for $\delta$ is approximately given by $$\delta_{low} \approx \frac{K}{2N} + \frac{1}{6}\frac{K}{N}\bar{g}_k - \frac{1}{2}. \quad (77)$$

Figure 14:
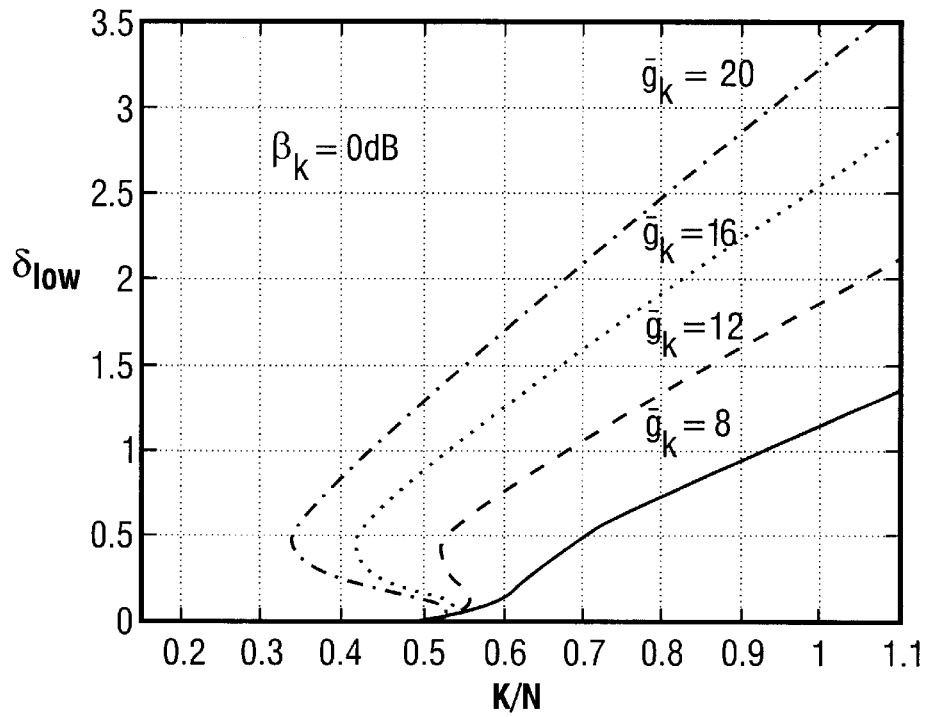
FIG. 14 shows the exact values of $\delta_{low}$ for $\beta_k=0$ dB.
Figure 15:
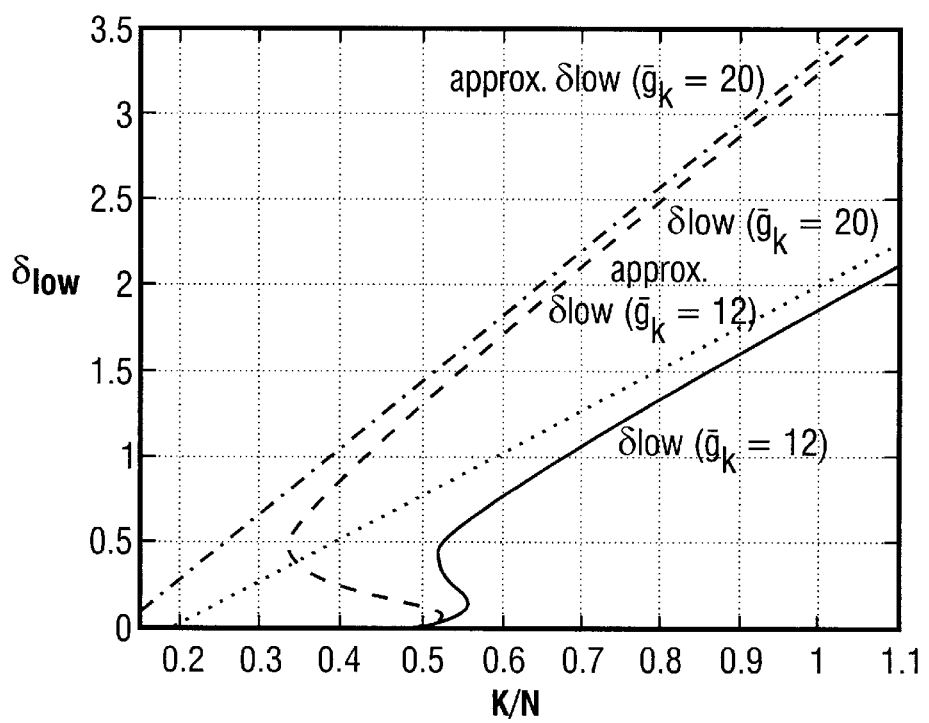
FIG. 15 shows a comparison of the exact and approximated values of $\delta_{low}$.
Figure 16:
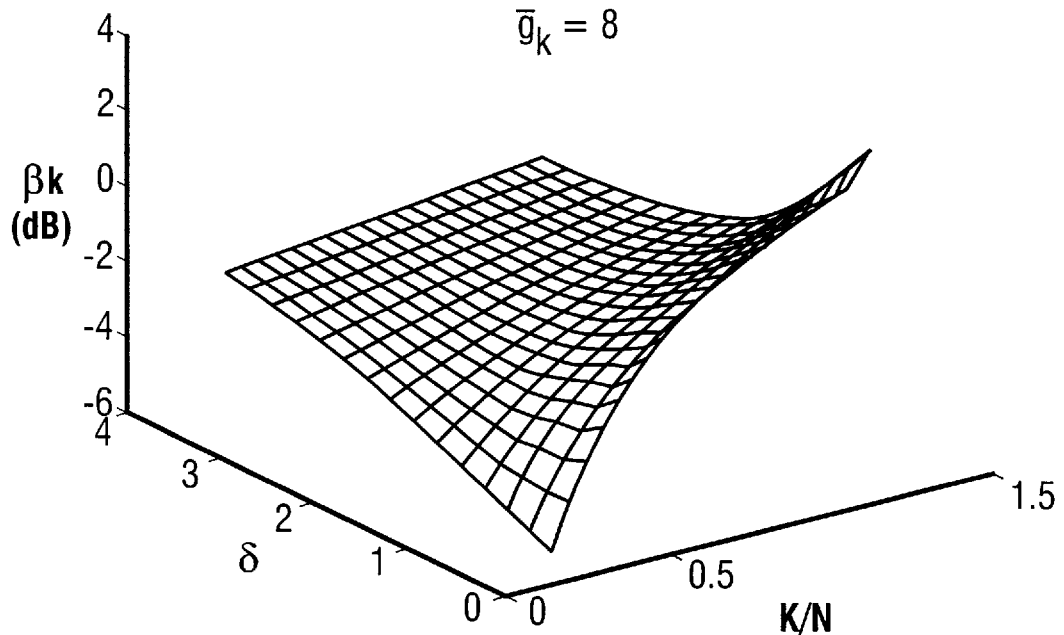
FIG. 16 shows the $\beta_k$ as a function of K/N and δ for $\bar{g}_k=8$.
Figure 17:
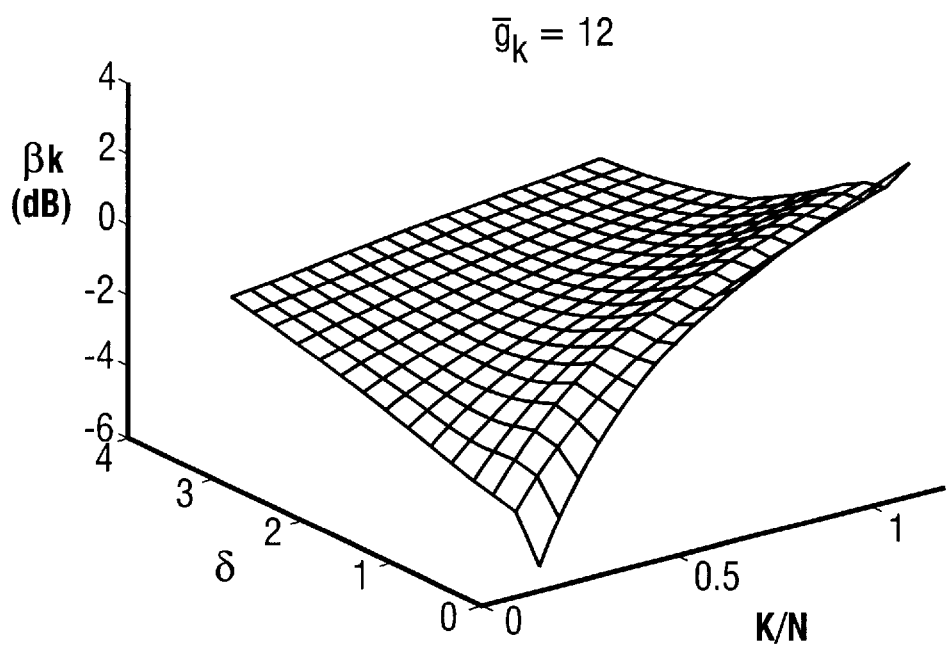
FIG. 17 shows the $\beta_k$ as a function of K/N and δ for $\bar{g}_k=12$.
Figure 18:
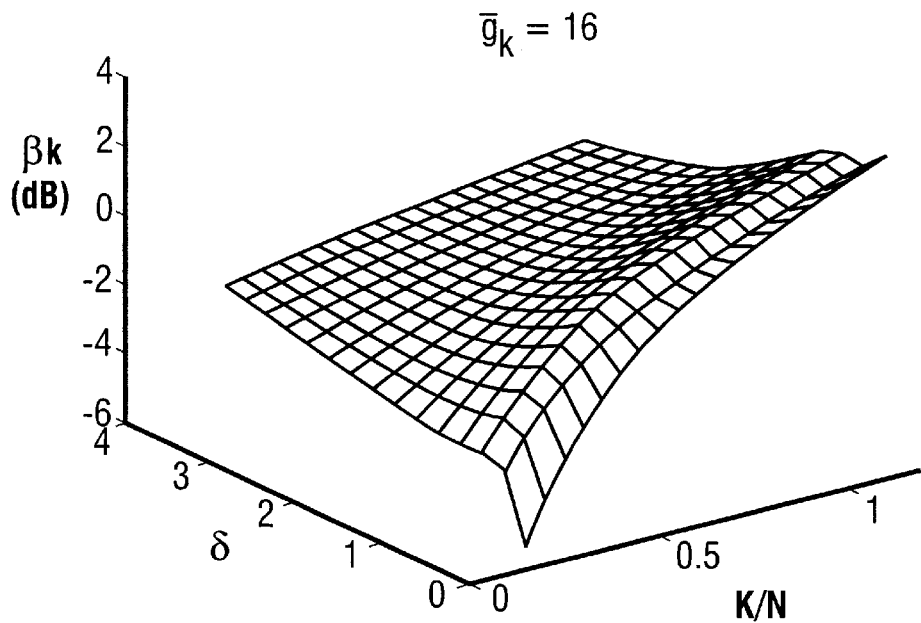
FIG. 18 shows the $\beta_k$ as a function of K/N and δ for $\bar{g}_k=16$.
Figure 19:
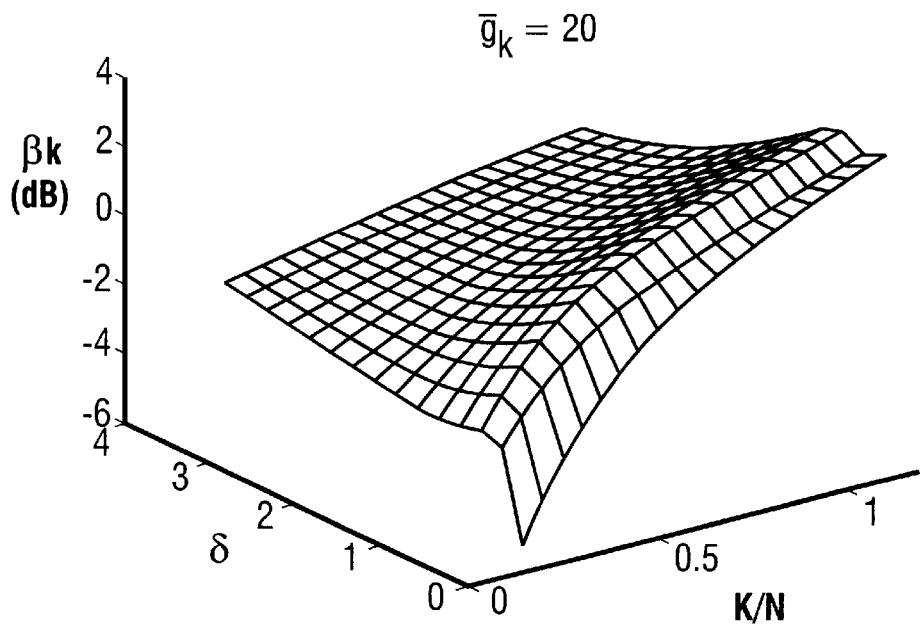
FIG. 19 shows the $\beta_k$ as a function of K/N and δ for $\bar{g}_k=20$.

FIG. 14 shows the exact value of $\delta_{low}$ for $\bar{g}_k=8, 12, 16$, and 20. The exact value and the approximated value of $\delta_{low}$ are compared in FIG. 15 for $\bar{g}_k=12$ and 20.

FIGS. 16–19 shows $\beta_k$ (in dB) against K/N and $\delta$ for $\bar{g}_k=8, 12, 16$, and 20, respectively. It can be seen that the area above 0 dB increases with $\bar{g}_k$, especially for small $\delta$ and large K/N.

Figure 20:
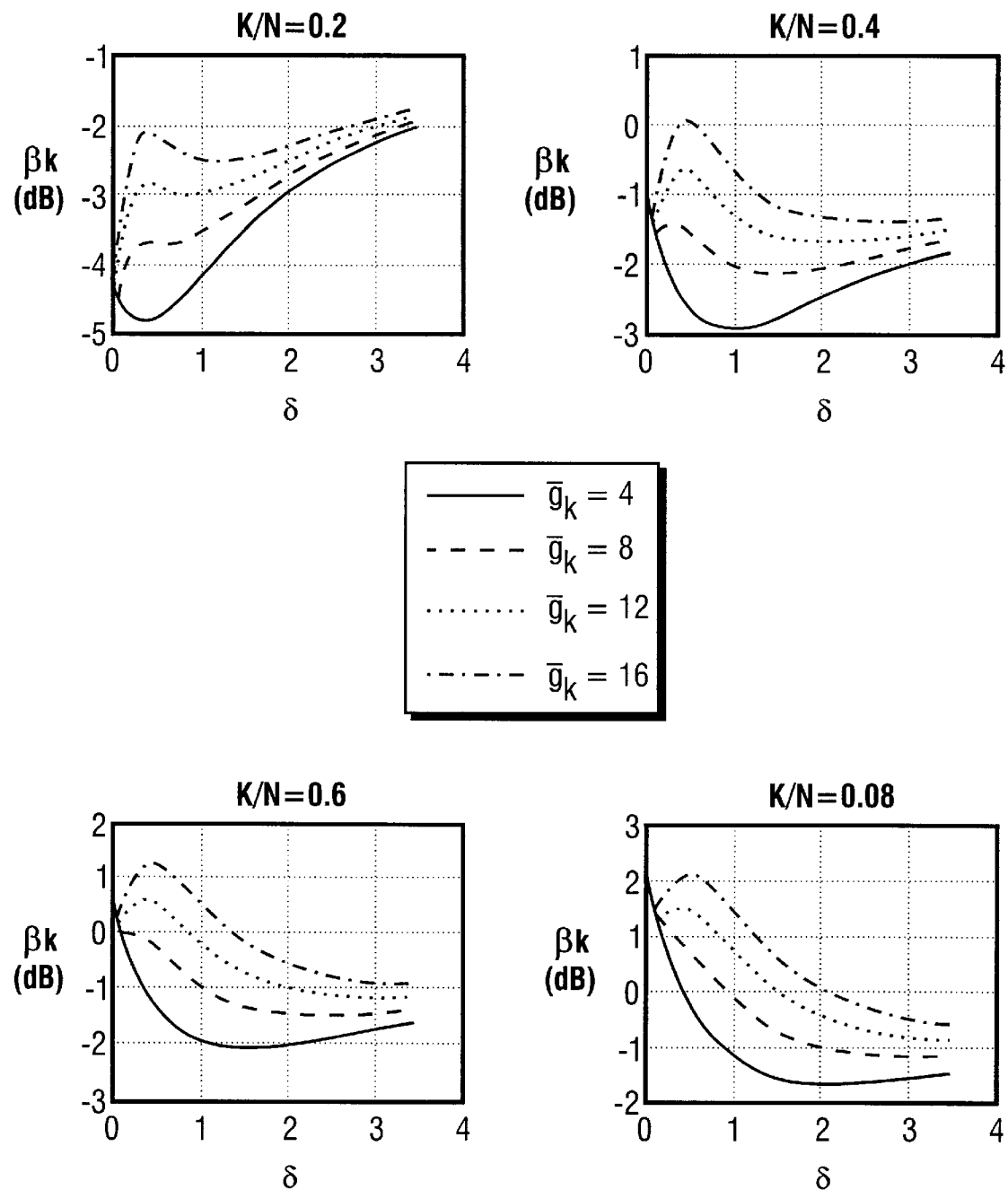
FIG. 20 shows the $\beta_k$ as a function of δ for K/N=0.2, 0.4, 0.6, and 0.8 and different values of $\bar{g}$.

FIG. 20 shows the values of $\beta_k$ (in dB) against $\delta$ for K/N=0.2, 0.4, 0.6, and 0.8.

It should be noted that $\bar{g}_k$ be bounded. Otherwise, $\beta_k$ will easily exceed 0dB for large value of $\bar{g}_k$. This can be understood by the result that the expectation value E{g(x,y)} is large when x is close to zero and $\bar{g}_k$ will be close to E{g(x,y)} for x=$V_{(2k-1)(2k-1)}$/N when K is large. Therefore, one of the alternatives for avoiding a large $\bar{g}_k$ is to discard the information carried by very small $V_{ll}$.

For example, the information carried by $V_{ll}$ <$\epsilon$N where $\epsilon$<<1. In this case, the lth row and the lth column of matrices $O_\delta$ and $D_\delta^{-1}$ are set to zeros, and the lth component of vector y(i) is set to zero. Moreover, the combining ratio, $\xi$, in Equation (55) will be zero if l is an even number and 1 if l is an odd number.

Therefore, in a preferred operation of the multiuser detector 200 in FIG. 2, the output signals, $y_{2k-1}(i)$, from the integrate-and-dump detector 209 will be set to zero when the delay $\tau_k$ of the kth user is smaller than a threshold value, $\tau_{min}$, since the filtering effect of the integration sampling process is substantially eliminated when $\tau_k<\tau_{min}$. One example of setting the threshold value $\tau_{min}$ is $$\tau_{min} = \frac{T}{N}, \quad (78)$$

where T is the symbol bit duration and N is the processing gain.

The optimal $\delta$ value produces the minimum average value of $\beta_k$ for all K users:

$$\bar{\beta}_{opt} \triangleq \min_{\delta} \bar{\beta} \quad (79)$$

$$= \min_{\delta} \frac{1}{K} \sum_{k=1}^{K} \beta_k$$

$$= \min_{\delta} \frac{\left(\delta^2 + \frac{2}{3}\frac{K}{N}\right)^2 + \frac{2}{9}\left(\frac{K}{N}\right)^2 + \frac{1}{3}\delta^2\frac{K}{N}\bar{g}}{\left(\delta^2 + \frac{1}{3}\frac{K}{N}\right)(1+\delta)^2}.$$

$$\bar{g} \triangleq \frac{1}{K} \sum_{k=1}^{K} \bar{g}_k. \quad (80)$$

which results in the following equation for $\delta_{opt}$:

$$\delta_{opt}^5 - \frac{K}{N}\left(1 + \frac{1}{3}\bar{g}\right)\delta_{opt}^4 + \frac{2}{3}\left(\frac{K}{N}\right)\delta_{opt}^3 - \quad (81)$$

$$\frac{4}{3}\left(\frac{K}{N}\right)^2\delta_{opt}^2 + \frac{1}{9}\left(\frac{K}{N}\right)^2(\bar{g}-2)\delta_{opt} - \frac{2}{9}\left(\frac{K}{N}\right)^3 = 0.$$

Figure 21:
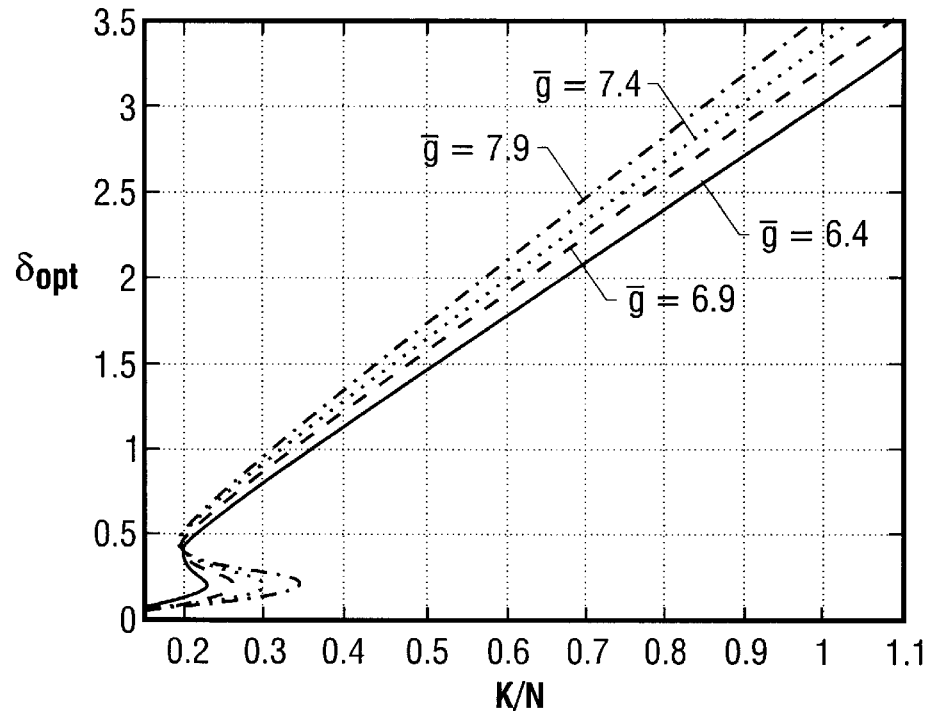
FIG. 21 shows the contour of $\delta_{opt}$ as a function of K/N at different $\bar{g}$.

FIG. 21 shows $\delta_{opt}$ vs. K/N for different values of $\bar{g}$. It can be shown that $\delta_{opt}$ can be approximated by the following formula:

$$\delta_{opt} \approx \frac{K}{N}\left(1 + \frac{1}{3}\bar{g}\right) \quad (82)$$

Figure 22:
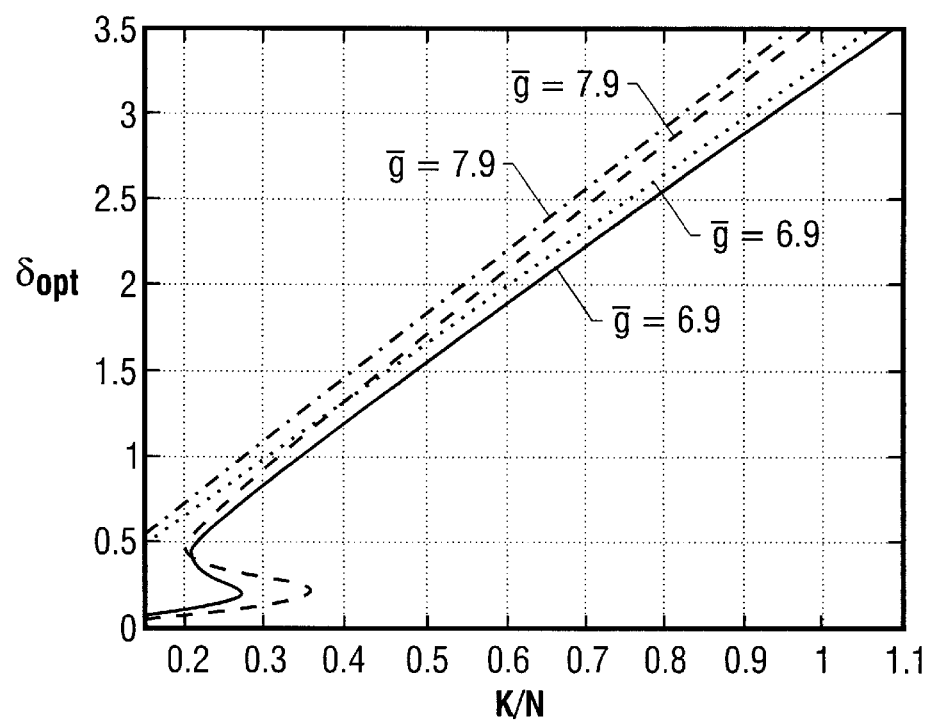
FIG. 22 shows the contour of exact and approximated values of $\delta_{opt}$ as a function of K/N at different $\bar{g}$.

The exact value and the approximated value of $\delta_{opt}$ are compared in FIG. 22, which shows a small deviation.

The preferred embodiment of the present invention uses the approximated value of $\delta_{opt}$ of Equation (82) as a criterion for choosing an optimal the approximated value of $\delta_{opt}$.

Parameter $\bar{g}$ in Equation (82) usually does not change significantly. Hence, the optimal $\delta_{opt}$ is essentially a function of number of users, K, and the processing gain, N.

Figure 23:
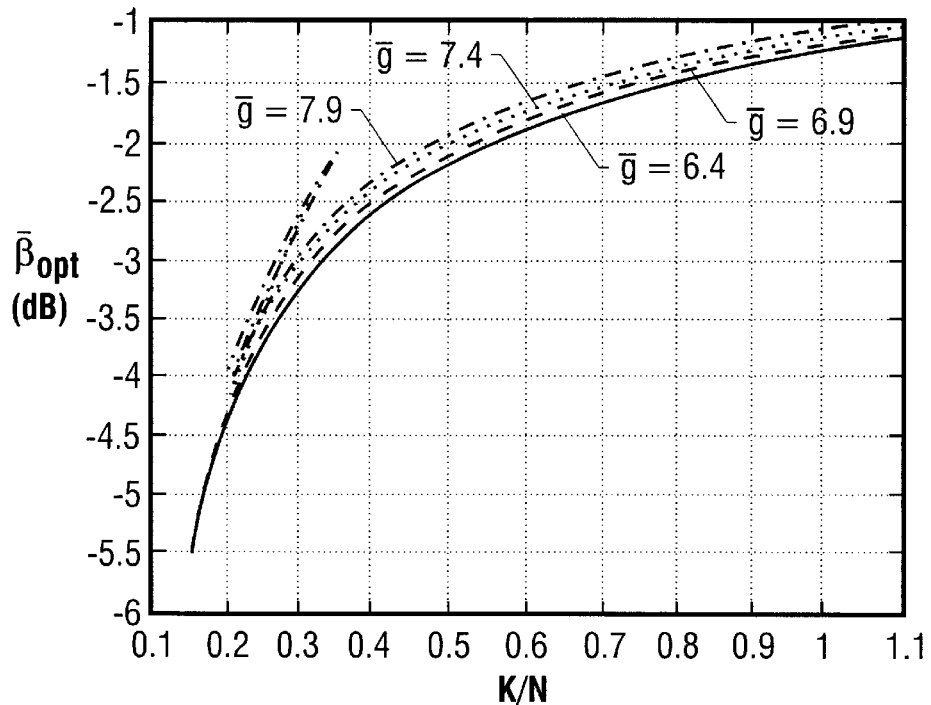
FIG. 23 shows $\bar{\beta}_{opt}$ as a function of K/N for $\bar{g}$.

FIG. 23 shows the average $\bar{\beta}_{opt}$ in dB as a function of K/N for different values of $\bar{g}$. It is shown that $\bar{\beta}_{opt}$ can be as small as −5.5 dB for K/N=0.15. When K/N=1.1, $\bar{\beta}_{opt}$ still has a value of −1dB.

Figure 24:
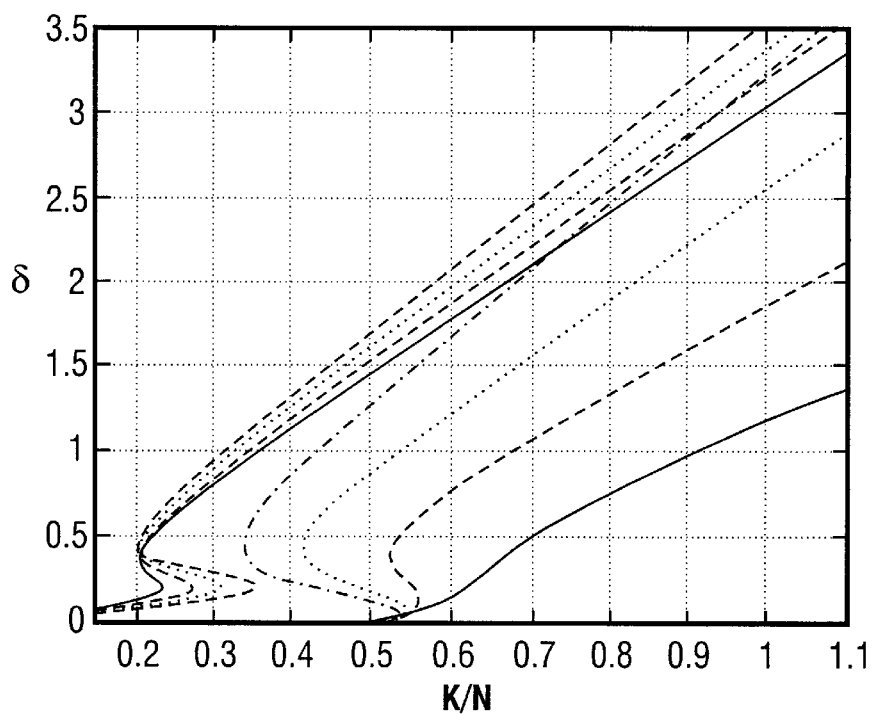
FIG. 24 shows a comparison of $\delta_{low}$ and $\delta_{opt}$.

FIG. 24 compares $\bar{\delta}_{opt}$ and $\delta_{low}$ in terms of K/N for different values of $\bar{g}$. It is shown that $\delta_{opt}$ satisfies the convergence requirement for $g_k \leq 16$.

Figure 25:
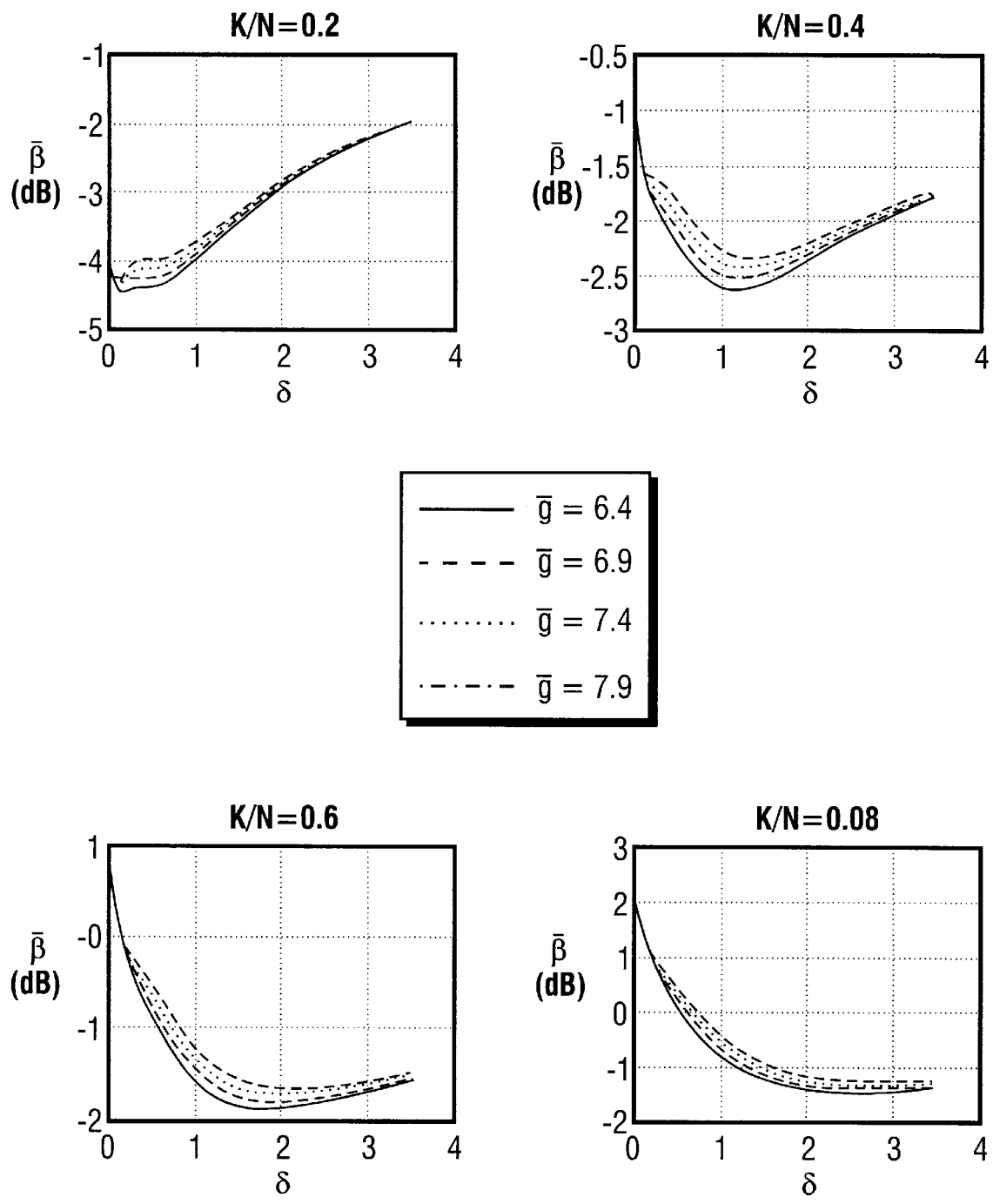
FIG. 25 shows $\bar{\beta}$.versus δ for K/N=0.2, 0.4, 0.6, and 0.8.

FIG. 25 further shows that $\delta_{opt}$ indeed achieves the optimized value $\bar{\beta}_{opt}$ for K/N=0.2, 0.4, 0.6, and 0.8.

Simulation Results for Preferred Multiuser Detector

Several operation scenarios of the preferred multiuser detector 200 were stimulated to demonstrate the some aspects of the present invention.

It is assumed that each users' PN sequence is generated by using the following generator function, $$g(x) = x^{42} + x^{35} + x^{33} + x^{31} + x^{27} + x^{26} + x^{25} + x^{22} + x^{21} + \qquad (83)$$
$$x^{19} + x^{18} + x^{17} + x^{16} + x^{10} + x^7 + x^6 + x^5 + x^4 + x^3 + x^2 + x + 1$$

The symbol delay, $\tau_k$, the received carrier phase, $\theta_k$, and the transmitted data, $b_k(i)$, for all users are randomly generated. The input signal y(i) to the multi-order detector module 220 of FIG. 2 is obtained by using R(i)z(i)=y(i).

Figure 26:
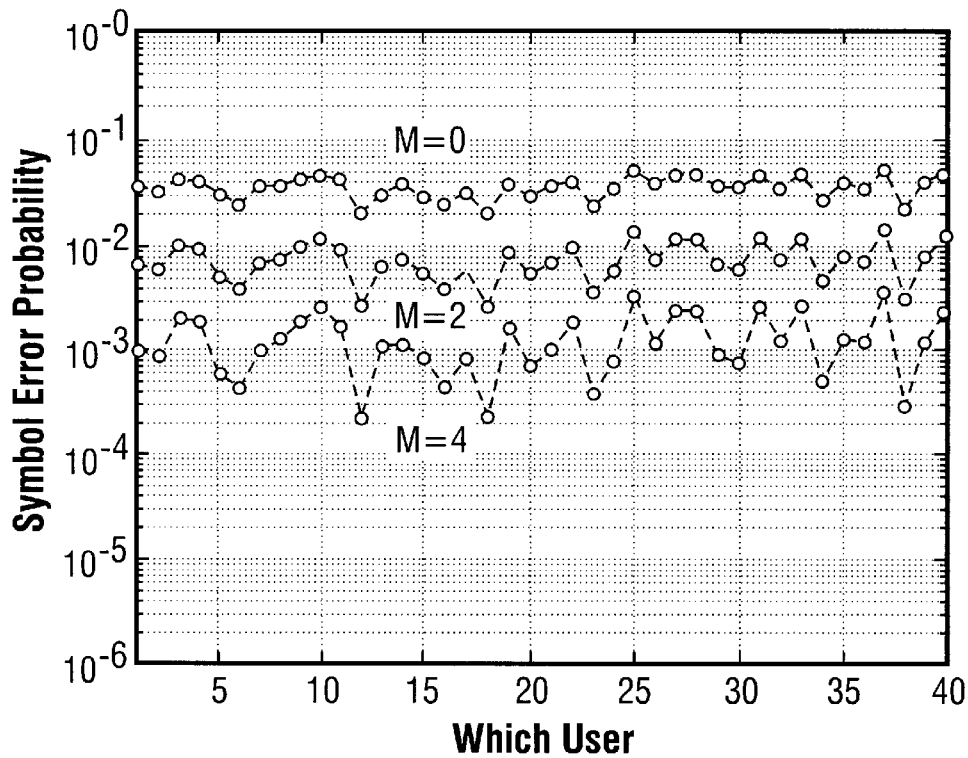
FIG. 26 shows the results of the simulation of the symbol error rate probability for each user for the preferred embodiment of the multiuser detector.

A symbol data rate is subsequently generated by comparing the estimated data, $b_k^{(M)}(i)$ with the transmitted data, $b_k(i)$. FIG. 26 shows the symbol error rate of each user for the δ-adjusted Mth-order multiuser detector 200. Comparison are made for M=0, 2, and 4. Each data point is generated with $10^6$ simulated symbols. In this simulation, the number of users in the system, K, is set to 40, and the symbol processing gain, N, is 42. Moreover, the ε is set to 1/42=0.0238, i.e., any information carried in any interval shorter than 1 chip will be discarded. It can be shown that the variable $\bar{g}$ has a value of 6.9 for ε=1/42=0.0238. The optimal value of δ is approximately given by $\delta_{opt}=(K/N)(1+\bar{g}/3)=3.143$ for $\bar{g}=6.9$.

Figure 27:
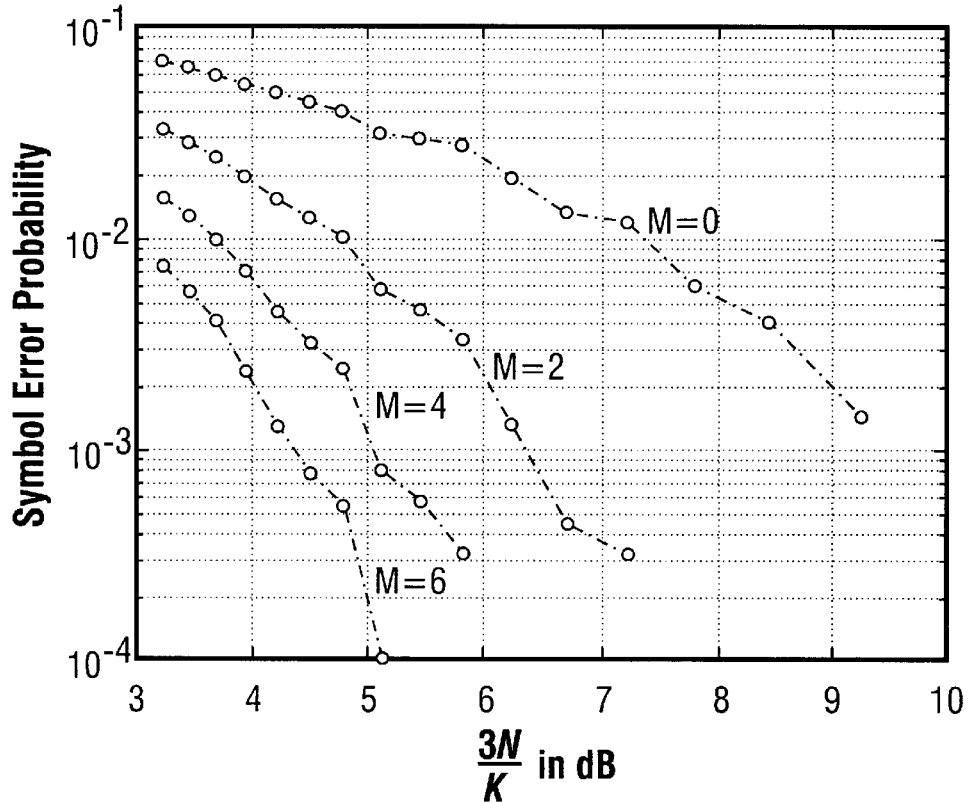
FIG. 27 shows the simulated average symbol error probability of all users versus 3K/N in units of dB.

FIG. 27 illustrates the average symbol error rate of all users against 3N/K in dB for M=0, 2, 4, and 6. The parameters, except K and $\delta_{opt}$, are set to the same values as in the first simulation shown in FIG. 26. Again, each point is generated with $10^6$ simulated symbols.

FIG. 27 indicates that the system capacity increases as M increases. The system capacity is usually defined as the number of users that can be accommodated in a system with the average symbol error rate below some threshold value. For example, if the performance target is set to keep the average symbol error rate below $10^{-2}$, then FIG. 27 shows that there is a capacity gain of about 2.5 dB for M=2 as compared to M=0.

The above described multiuser detector can also work for a system with inclusion of the background noise such as additive white Gaussian noise.

In addition, the present invention can also be used to improve incoherent system. Many terrestrial wireless applications use non-coherent detection because each user has independent random phase due to Rayleigh fading channel. The coherent detection can easily be used in forward link (base station to mobile station) detection in an IS-95 based CDMA cellular system because the existence of the pilot signal. The multiuser detector of the present invention can be used to cancel interference caused by signal from adjacent cells, especially when the mobile station is in a hand-off region.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. An information processing system for detecting a spreaded signal having information from a plurality of users in a CDMA system, comprising:

a receiving processor, having a demodulating element connected and configured to convert said spreaded signal into a baseband signal, at least one multiplier connected and configured to despread said baseband signal to produce a despreaded signal corresponding to one user, an integrating element corresponding to said at least one multiplier and operating to integrate said despreaded signal by first and second integration times to respectively produce first and second integrated signals;

a digitization module comprising first and second digitizers connected to said integrating element to respectively sample and digitize said first and second integrated signals into first and second digital signals respectively indicative of said first and second integrated signals; and a digital detector connected to receive said first and second digital signals and configured to digitally process said first and second digital signals to produce a digital output indicating information from said one user and to substantially remove interference noise caused by signals from other users based on cross correlation of different users.

2. A system as in claim 1, wherein said integrating element is configured in such a way that said first and second integration times have a relation with a delay time in said despreaded signal for said one user.

3. A system as in claim 1, wherein said digital detector includes a plurality of digital processing modules connected to one another in series, operating to sequentially process said first and second digital signals based on an approximation process to reduce said interference, each of said digital processing modules adjusting a system status parameter according to a number of said users to increase a processing speed.

4. A method for reducing interference of cross correlation of user signals from different users in a CDMA system, comprising:

sampling a received signal imprinted with said user signals to obtain a demodulated signal;

processing said demodulated signal according to a first correlation operation to produce despreaded signals respectively corresponding to different users by using predetermined codes;

performing a first integration for a first integration time on each despreaded signal to produce a first integrated signal and a second integration for a second integration time on each despreaded signal to produce a second integrated signal;

sampling and digitizing said first and second integrated signals to produce first and second digital signals for each despreaded signal;

processing said first and second digital signals corresponding to each despreaded signal with a second correlation operation according to an operating condition of said CDMA system to reduce interference noise in said first and second digital signals; and performing a plurality of recursive operations of said second correlation to reduce said interference noise below a desired level.

5. A system as in claim 3, wherein each digital processing module comprises:

a parameter generator configured to produce a control parameter that varies with a number of users;

a correlation processor connected to said parameter generator to receive said control parameter and configured to generate correlation information indicative of auto correlation and cross correlation of said users based on a set of user identification codes respectively corresponding to said users and a set of relative phase values for said users, wherein said correlation information has a dependence on said control parameter;

an approximation processor connected to receive said correlation information from said correlation processor and digital signals having information from said users and configured to produce approximate digital signals indicative of said information from said users and having a reduced amount of said interference noise; and a decision processor connected to said approximation processor and operating to process said approximate digital signals to produce a digital output representing digital symbols from said users.

6. A system as in claim 5, wherein said approximation processor is configured to combine said first and second digital signals for said one user by weighting factors respectively proportional to said first and second integration times.

7. A method for reducing interference noise in detection of transmitted symbols of a plurality of users in a CDMA system, comprising:

demodulating and converting a CDMA signal imprinted with said transmitted symbols from said users into a baseband signal;

despreading said baseband signal into a plurality of user signals respectively corresponding to said users;

respectively integrating each user signal for a first integration period to produce a first integrated user signal and for a second integration period to produce a second integrated user signal;

converting said first and second integrated user signals into first and second digital user signals for each of said users;

forming a user signal array, y, with said first and second digital user signals from each of said users, wherein a number of elements in said user signal array y is twice of a number of said users;

forming a symbol array, z, with said transmitted symbols that are to be determined, wherein said user signal array y and said symbol array z are associated with each other by a matrix R according to a relationship of y=R z;

performing a digital matrix inversion process to determine an inverse matrix $R^{-1}$ of said matrix R so that said interference noise is reduced; and determining said transmitted symbols from said users by using a relationship of $z=R^{-1}$ y.

8. The method as in claim 7, wherein said digital matrix inversion process is carried out by using a control parameter $\delta$ to decompose said matrix R into a diagonal matrix $D_\delta$ and off diagonal matrix $O_f$:

$$\begin{aligned} R &= D + O_f \\ &= (1+\delta)D\left(I + \frac{1}{1+\delta} D^{-1}O_f\right) - \delta D \\ &= D_\delta(I + F_\delta), \end{aligned}$$

wherein said control parameter $\delta \neq 0$, I is a unity matrix and $$D_\delta = (1+\delta)D,$$

$$O_\delta = O_f - \delta D,$$

$$F_\delta = D_\delta^{-1} O_\delta.$$

9. A method as in claim 8, wherein said control parameter $\delta$ has a dependence on said number of users in said CDMA system and is configured to reduce said interference noise.

10. A method as in claim 8, wherein said digital matrix inversion process comprises:

determining matrices $D_\delta$ and $O_\delta$ according to a set of pseudo random user codes assigned to said users and a set of relative phases of said users;

performing a plurality of recursive operations as defined by $$x^{(M)} = (O_\delta D_\delta^{-1})^M y,$$

$$s^{(M)} = \sum_{m=0}^{M} (-1)^m x^{(m)},$$

wherein M is an integer (0, 1, 2, ... ) representing a number of said recursive operations and is set at a value that said interference noise is below a desired level; and producing estimated results of said transmitted symbols from said users.

11. A method as in claim 7, wherein said first and second integration times have a dependence on a symbol delay time in said transmitted symbols of said users.

* * * * *